US012800033B2

(12) United States Patent
Ragavan et al.

(10) Patent No.: US 12,800,033 B2
(45) Date of Patent: Nov. 17, 2026

(54) GATE VALVE WITH SINGLE OR DUAL SEATS AND SEAT ASSEMBLIES FOR A GATE VALVE

(71) Applicant: Sayatva, LLC, Houston, TX (US)

(72) Inventors: Gayathri Srinivasa Ragavan, Irvine, CA (US); S. Hari Vignesh, Viralimalai (IN)

(73) Assignee: Sayatva, LLC, Houston, TX (US)

( * ) Notice: Subject to any disclaimer, the term of this patent is extended or adjusted under 35 U.S.C. 154(b) by 0 days.

(21) Appl. No.: 19/032,999

(22) Filed: Jan. 21, 2025

(65) Prior Publication Data

US 2025/0164012 A1 May 22, 2025

Related U.S. Application Data

(60) Division of application No. 18/766,094, filed on Jul. 8, 2024, now Pat. No. 12,203,559, which is a continuation-in-part of application No. 18/336,805, filed on Jun. 16, 2023, now Pat. No. 12,345,345.

(51) Int. Cl.
*F16K 3/02* (2006.01)

(52) U.S. Cl.
CPC .......... *F16K 3/0227* (2013.01); *F16K 3/0209* (2013.01); *F16K 3/0236* (2013.01); *F16K 3/0254* (2013.01)

(58) Field of Classification Search
CPC .... F16K 3/0227; F16K 3/0209; F16K 3/0254; F16K 3/0236
See application file for complete search history.

(56) References Cited

U.S. PATENT DOCUMENTS

| | | | |
|---|---|---|---|
| 6,279,875 | B1 | 8/2001 | Chatufale |
| 9,453,578 | B2 | 9/2016 | Sundararajan |
| 9,841,117 | B2 | 12/2017 | Sundararajan |
| 9,885,420 | B2 | 2/2018 | Sundararajan |
| 10,066,757 | B2 | 9/2018 | Sundararajan |
| 10,174,848 | B2 | 1/2019 | Sundararajan |
| 10,197,077 | B2 | 2/2019 | Sundararajan et al. |
| 10,563,790 | B2 | 2/2020 | Sundararajan |
| 10,677,360 | B2 | 6/2020 | Sundararajan |
| 11,125,341 | B2 | 9/2021 | Sundararajan |
| 11,131,393 | B2 | 9/2021 | Sundararajan |
| 11,174,958 | B2 | 11/2021 | Moseley et al. |

(Continued)

FOREIGN PATENT DOCUMENTS

WO 2022204020 A1 9/2022

*Primary Examiner* — Marina A Tietjen

(57) ABSTRACT

A gate valve comprises a valve body including a cavity and a flow bore with a flow axis. A gate in the cavity is movable along a stem axis between an open and closed position. A first seat is in a first pocket of the body on one side of the gate. An upstream seal is disposed between upstream opposing faces of the first seat and the first pocket, these upstream opposing faces being parallel to the bore axis, and the upstream seal is configured to prevent fluid moving axially from the flow bore toward the gate. A downstream seal is disposed between downstream opposing faces of the first seat and the first pocket, these downstream opposing faces being perpendicular to the bore axis, and the downstream seal is configured to prevent fluid moving from the cavity toward the flow bore in a direction perpendicular to the bore axis.

12 Claims, 15 Drawing Sheets

(56) References Cited

U.S. PATENT DOCUMENTS

| | | | | |
|---|---|---|---|---|
| 11,549,594 | B2 | 1/2023 | Sundararajan | |
| 11,644,105 | B2 | 5/2023 | Sundararajan | |
| 2002/0036279 | A1* | 3/2002 | Chatufale | F16K 5/0471<br>251/172 |
| 2003/0015681 | A1* | 1/2003 | Chatufale | F16K 3/0227<br>251/329 |
| 2004/0178381 | A1 | 9/2004 | Sundararajan | |
| 2005/0067599 | A1 | 3/2005 | Chatufale | |
| 2012/0085957 | A1 | 4/2012 | Dhawan et al. | |
| 2015/0014568 | A1 | 1/2015 | Sundararajan | |
| 2016/0327165 | A1 | 11/2016 | Sundararajan | |
| 2017/0009891 | A1 | 1/2017 | Sundararajan | |
| 2018/0156338 | A1 | 6/2018 | Sundararajan | |
| 2021/0025505 | A1 | 1/2021 | Vijay | |

* cited by examiner

GATE VALVE WITH SINGLE OR DUAL SEATS AND SEAT ASSEMBLIES FOR A GATE VALVE

CROSS-REFERENCE TO RELATED APPLICATIONS

This application is a divisional of U.S. patent application Ser. No. 18/766,094, filed Jul. 8, 2024, entitled GATE VALVE WITH SINGLE OR DUAL SEATS AND SEAT ASSEMBLIES FOR A GATE VALVE, issued as U.S. Pat. No. 12,203,559 on Jan. 21, 2025, which is a continuation-in-part of U.S. patent application Ser. No. 18/336,805, entitled GATE VALVE AND SEAT FOR A GATE VALVE, filed Jun. 16, 2023. Application Ser. Nos. 18/766,094 and 18/336,805 are each incorporated by reference herein in their entirety.

TECHNICAL FIELD

The present disclosure relates to gate valves, seat assemblies for gate valves, and sealing components for use in gate valves and seat assemblies therefor.

BACKGROUND

Gate valves are used, e.g., in oilfield drilling and production applications, to control the flow of fluid through piping and equipment. Most commonly, gate valves are used where the desired flow alternates between a state of unrestricted fluid flow (i.e., valve passage fully open) and a state of zero fluid flow (i.e., valve passage fully closed). When fully closed, the gate valve is also expected to isolate (or "seal") against fluid leakage or pressure loss from one side of the valve to the other.

Some gate valves have a "unidirectional" design that seals against fluid leakage or pressure loss only when the valve is oriented such that a predetermined first side (known as the "upstream side") of the valve is exposed to higher pressure than the second side (known as the "downstream side"). A unidirectional gate valve may leak fluid or pressure through the closed valve when the downstream side is exposed to higher pressure than the upstream side. Accordingly, unidirectional valves are most suitable for use in applications where the fluid flow will be in a single known direction. In contrast, other gate valves have a "bidirectional" design that seals against fluid leakage or pressure loss regardless of the direction of fluid flow and regardless of which side of the valve is exposed to the higher pressure. Bidirectional valves are suitable for use in applications where the direction of fluid flow may be in either direction or where the flow direction is expected to reverse during different operations.

The fluids encountered in oilfield operations can include gases, liquids and semiliquid slurries comprising solid particles suspended in a liquid. Slurries containing sand or rock particles can be extremely abrasive to the interior surfaces of valves, especially to the sealing surfaces and sealing assemblies. High pressure fluid leaking into the cavity of the valve body can place pressure on the stem packing seal and can also carry abrasive particles which can damage the valve body, seals, seats, stem and other components of the valve, leading to premature failure and increased maintenance. High pressure fluid leaking from the cavity into the downstream portion of the flow bore can carry abrasive particles that can cut the seals, seats and valve body and can result in excessive or dangerous pressures in downstream areas of the piping. A need therefore exists, for a gate valve having greater resistance to wear and damage from abrasive fluids.

Conventional gate valves have been described in references including U.S. Patent Publication No. US2015/0014568 to Sundararajan, entitled GATE VALVE WITH SEAT ASSEMBLY and published Jan. 15, 2105, U.S. Patent Publication No. US2016/0327165 to Sundararajan, entitled GATE VALVE and published Nov. 10, 2016, U.S. Patent Publication No. US2017/0009891 to Sundararajan, entitled GATE VALVE WITH SEAT ASSEMBLY and published Jan. 12, 2017, U.S. Patent Publication No. US2018/0156338 to Sundararajan, entitled GATE VALVE and published Jun. 7, 2018, and U.S. Patent Publication No. US2021/0025505 to Vijay, entitled VALVE ASSEMBLIES AND ASSOCIATED COMPONENTS, published Jan. 28, 2021. U.S. Patent Publications Nos. US2015/0014568, US2016/0327165, US2017/0009891, US2018/0156338 and US2021/0025505 are all incorporated by reference herein in their entireties.

SUMMARY

In one aspect, a gate valve comprises a valve body including a cavity in fluid communication with a flow bore, having inner and outer flow bore portions, which extends between first and second valve body portions along a bore axis. A gate is disposed in the cavity and movable along a stem axis perpendicular to the bore axis between a closed gate position and an open gate position, wherein the gate is the configured to seal the flow bore in the closed gate position and unseal the flow bore in the open gate position. A first seat is between the first valve body portion and the gate, the first seat disposed in a first cylindrical pocket on an inner surface of the cavity, and a second seat is between the second valve body portion and the gate, the second set disposed in a second pocket on the inner surface of the cavity. A first upstream seal is disposed between first opposing faces of the first seal and the first pocket, wherein the first opposing faces of the first seal and the first pocket are parallel to the bore axis, and wherein the first upstream seal is configured to prevent fluid from moving a direction toward the gate. A first downstream seal is disposed between the second opposing faces of the first seal and the first pocket, wherein the second opposing faces of the first seal and the first pocket are oriented perpendicular to the bore axis, and the first downstream seal is configured to prevent fluid from moving in a direction perpendicular to the bore axis.

In another aspect, a gate valve comprises a valve body including a cavity in fluid communication with a flow bore, the flow bore defining a bore axis through the valve body and having a first outer bore portion defined by a first body portion on a first side of the cavity and a second outer bore portion defined by a second body portion on a second side of the cavity. An annular first seat is disposed in a first pocket formed on an inner surface of the first body portion adjacent the cavity, the first seat having a seat bore therethrough forming a first inner bore portion of the flow bore. An annular second seat is disposed in a second pocket formed on an inner surface of the second body portion adjacent the cavity, the second seat having a seat bore therethrough forming a second inner bore portion of the flow bore. A gate is disposed in the cavity between the first seat and the second seat and is movable along a stem axis perpendicular to the bore axis between an open gate position and a closed gate position. When the gate is in the open gate position, a gate bore formed therethrough is aligned with the first inner bore portion and the second inner bore portion to allow flow through the valve body, and when the gate is in the closed gate position, the gate bore is not aligned with the first inner bore portion and the second inner bore portion to block flow through the valve body. A first upstream seal is disposed between a first upstream pair of opposing faces of the first seat and the first pocket. The first upstream pair of opposing faces are oriented parallel to the bore axis, wherein the first upstream seal is configured to prevent fluid from moving in a direction from the flow bore into the cavity. A first downstream seal is disposed between a first downstream pair of opposing faces of the first seat and the first pocket. The first downstream pair of opposing faces are oriented perpendicular to the bore axis, wherein the first downstream seal is configured to prevent fluid from moving in a direction from the cavity into the flow bore.

In one embodiment, the first upstream pair of opposing faces includes a outwardly radial face of a first shoulder formed at an axial end of the first seat adjacent the first body portion, and an inwardly radial face of the first pocket.

In another embodiment, the first upstream seal is a spring energized seal including a flexible polymeric jacket having a pair of sealing lips extending from a jacket base to form, when viewed in cross section, one of a V-shaped and U-shaped cup. A metallic energizing spring is disposed in the cup of the jacket between the sealing lips to bias the sealing lips outwards relative to one another against the first upstream pair of opposing faces. The sealing lips are oriented parallel to the bore axis and an opening of the cup between the sealing lips faces axially away from the cavity.

In still another embodiment, the first downstream pair of opposing faces includes an axial face of a second shoulder formed on the first seat facing toward the first body portion, wherein outward radial surfaces of the first shoulder and the second shoulder of the first seat are disposed at different radial distances from the bore axis, and axial surfaces of the first shoulder and the second shoulder of the first seat are disposed at different axial distances from the axial end of the first seat adjacent to the first body portion. The pair also includes an axial face of the first pocket facing toward the cavity.

In yet another embodiment, the first downstream seal is a spring energized seal including a flexible polymer jacket having a pair of sealing lips extending from a jacket base to form, when viewed in cross section, one of a V-shaped and U-shaped cup. A metallic energizing spring is disposed in the cup of the jacket between the sealing lips to bias the sealing lips outwards relative to one another against the first downstream pair of opposing faces. The sealing lips are oriented perpendicular to the bore axis and an opening of the cup between the sealing lips faces radially away from the bore axis.

In a further embodiment, the first seat and the first pocket are configured to axially compress the sealing lips of the first downstream seal between the first downstream opposing faces without sliding either sealing lip across a stationary surface.

In a still further embodiment, the first shoulder and the second shoulder of the first seat are separated from one another by at least one axially-oriented intervening surface of the first seat and one radially-oriented intervening surface of the first seat.

In a yet further embodiment, the inward radial face of the first pocket and the axial face of the first pocket facing toward the cavity are separated from one another by at least one intervening surface of the first pocket that is not perpendicular to the bore axis and is not parallel to the bore axis.

In another embodiment, the gate valve further comprises a second upstream seal disposed between a second upstream pair of opposing faces of the second seat and the second pocket. The second upstream pair of opposing faces are oriented parallel to the bore axis; wherein the second upstream seal is configured to prevent fluid from moving in a direction from the flow bore into the cavity. A second downstream seal is disposed between a second downstream pair of opposing faces of the second seat and the second pocket. The second downstream pair of opposing faces are oriented perpendicular to the bore axis, wherein the second downstream seal is configured to prevent fluid from moving in a direction from the cavity into the flow bore.

In still another embodiment, the second upstream pair of opposing faces includes a outwardly radial face of a first shoulder formed at an axial end of the second seat adjacent the second body portion and an inwardly radial face of the second pocket.

In yet another embodiment, the second downstream pair of opposing faces includes an axial face of a second shoulder formed on the second seat facing toward the second body portion. Outward radial surfaces of the first shoulder and the second shoulder of the second seat are disposed at different radial distances from the bore axis, wherein axial surfaces of the first shoulder and the second shoulder of the second seat are disposed at different axial distances from the axial end of the second seat adjacent to the first body portion. The pair also includes an axial face of the second pocket facing toward the cavity.

In a further embodiment, a first seat face that is one of the first upstream pair of opposing faces and a second seat face that is one of the first downstream pair of opposing faces are disposed on different faces of the first seat. A first pocket face that is one of the first upstream pair of opposing faces and a second pocket face that is one of the first downstream pair of opposing faces are disposed on different faces of the first pocket.

In still another aspect, a seat assembly for a gate valve is configured for mounting in a pocket formed on an inner surface of a gate valve body. The seat assembly comprises an annular seat having a seat bore formed therethrough from a pocket side to a gate side defining a bore axis, a first shoulder for mounting an upstream seal and a second shoulder for mounting a downstream seal. The first shoulder includes a first outwardly radial face disposed at a first radius from the bore axis and extending axially from a first position at a first distance relative to the pocket side of the seat to a first corner disposed at a second distance relative to the pocket side, the second distance being greater than the first distance. The first shoulder further includes a first axial face extending radially outward from the first corner to a second radius from the bore axis, the second radius being greater than the first radius. The second shoulder includes a second outwardly radial face disposed at a third radius from the bore axis and extending axially from a second position at a third distance relative to the pocket side of the seat to a second corner disposed at a fourth distance relative to the pocket side, the fourth distance being greater than the third distance. The second shoulder further includes a second axial face extending radially outward from the second corner to a fourth radius from the bore axis, the fourth radius being greater than the third radius. An upstream seal is adapted for mounting on the first shoulder to prevent fluid flow in an axial direction from the pocket side toward the gate side. A downstream seal is adapted for mounting on the second shoulder to prevent fluid flow in a radial direction toward the bore axis.

In one embodiment, the annular seat further comprises a third shoulder disposed axially between the first shoulder and the second shoulder. The third shoulder includes a third outwardly radial face disposed at the second radius from the bore axis and extending axially to a third corner, the third corner disposed axially between the first corner and the second corner, and a third axial face extending radially outward from the third corner.

In another embodiment the third corner is disposed at the third distance from the pocket side and the third axial face extends radially outward from the third corner to the third radius from the bore axis.

In yet another embodiment, the upstream seal is a spring energized seal including a flexible polymeric jacket having a pair of sealing lips extending from a jacket base to form, when viewed in cross section, one of a V-shaped and U-shaped cup. A metallic energizing spring is disposed in the cup of the jacket between the sealing lips to bias the sealing lips outwards relative to one another. The jacket base of the upstream seal is configured to mount against the first axial face of the first shoulder and one of the pair of sealing lips of the upstream seal is configured to mount against the first outwardly radial face of the first shoulder.

In still another embodiment, the downstream seal is a spring energized seal including a flexible polymeric jacket having a pair of sealing lips extending from a jacket base to form, when viewed in cross section, one of a V-shaped and U-shaped cup. A metallic energizing spring is disposed in the cup of the jacket between the sealing lips to bias the sealing lips outwards relative to one another. The jacket base of the downstream seal is configured to mount against the second outwardly radial face of the second shoulder and one of the pair of sealing lips of the downstream seal is configured to mount against the second axial face of the second shoulder.

In yet another aspect, a seat for a gate valve is configured for mounting in a pocket formed on an inner surface of a gate valve body. The seat comprises an annular body having a seat bore formed therethrough from a pocket side to a gate side defining a bore axis, a first shoulder configured for mounting an upstream seal and a second shoulder configured for mounting a downstream seal. The first shoulder includes a first outwardly radial face disposed at a first radius from the bore axis and extending axially from a first position at a first distance relative to the pocket side of the seat to a first corner disposed at a second distance relative to the pocket side, the second distance being greater than the first distance. The first shoulder also includes a first axial face extending radially outward from the first corner to a second radius from the bore axis, the second radius being greater than the first radius. The second shoulder includes a second outwardly radial face disposed at a third radius from the bore axis and extending axially from a second position at a third distance relative to the pocket side of the seat to a second corner disposed at a fourth distance relative to the pocket side, the fourth distance being greater than the third distance. The second shoulder also includes a second axial face extending radially outward from the second corner to a fourth radius from the bore axis, the fourth radius being greater than the third radius.

In one embodiment, the annular seat further comprises a third shoulder disposed axially between the first shoulder and the second shoulder. The third shoulder includes a third outwardly radial face disposed at the second radius from the bore axis and extending axially to a third corner, the third corner disposed axially between the first corner and the second corner. The third shoulder also includes a third axial face extending radially outward from the third corner.

In another embodiment, the third corner is disposed at the third distance from the pocket side and the third axial face extends radially outward from the third corner to the third radius from the bore axis.

In a further aspect, a gate valve comprises a valve body including a cavity in fluid communication with a flow bore, the flow bore defining a bore axis through the valve body and having a first outer bore portion defined by a first body portion on a first side of the cavity and a second outer bore portion defined by a second body portion on a second side of the cavity. An annular first seat retainer is disposed in a first retainer pocket formed on an inner surface of the first body portion facing the second side of the cavity, the first seat retainer having a retainer bore therethrough forming a first intermediate bore portion of the flow bore. An annular first seat is disposed in a first seat pocket formed on an inner surface of the first seat retainer facing the second side of the cavity, the first seat having a seat bore therethrough forming a first inner bore portion of the flow bore. An annular second seat retainer is disposed in a second retainer pocket formed on an inner surface of the second body portion facing the first side of the cavity, the second seat retainer having a retainer bore therethrough forming a second intermediate bore portion of the flow bore. An annular second seat is disposed in a second seat pocket formed on an inner surface of the second seat retainer facing the first side of the cavity, the second seat having a seat bore therethrough forming a second inner bore portion of the flow bore. A gate is disposed in the cavity between the first seat and the second seat and is movable along a stem axis perpendicular to the bore axis between an open gate position and a closed gate position. When the gate is in the open gate position, a gate bore formed therethrough is aligned with the first inner bore portion and the second inner bore portion to allow flow through the valve body. When the gate is in the closed gate position, the gate bore is not aligned with the first inner bore portion and the second inner bore portion to block flow through the valve body. The gate valve further comprises a first retainer upstream seal disposed along a first outer interface between the first seat retainer and the first retainer pocket between a first retainer upstream pair of opposing faces of the first seat retainer and the first retainer pocket. A first seat upstream seal is disposed along a first inner interface between the first seat and the first seat pocket between a first seat upstream pair of opposing faces of the first seat and the first seat pocket. Both the first retainer upstream seal and the first seat upstream seal are configured to prevent fluid from moving along the first respective interfaces (i.e., the first outer interface and the first inner interface) in a direction from the flow bore into the cavity. A first retainer downstream seal is disposed along the first outer interface between a first retainer downstream pair of opposing faces of the first seat retainer and the first retainer pocket. A first seat downstream seal is disposed along the first inner interface between a first seat downstream pair of opposing faces of the first seat and the first seat pocket. Both the first retainer downstream seal and the first seat downstream seal are configured to prevent fluid from moving along the first respective interfaces in a direction from the cavity into the flow bore. The first retainer upstream pair of opposing faces has a first orientation relative to the bore axis and the first retainer downstream pair of opposing faces has a second orientation relative to the bore axis that is different from the first orientation. The first seat upstream pair of opposing faces has a third orientation relative to the bore axis and the first retainer downstream pair of opposing faces has a fourth orientation relative to the bore axis that is different from the third orientation.

BRIEF DESCRIPTION OF THE DRAWINGS

For a more complete understanding, reference is now made to the following description taken in conjunction with the accompanying Drawings in which.

DETAILED DESCRIPTION

Figure 1:
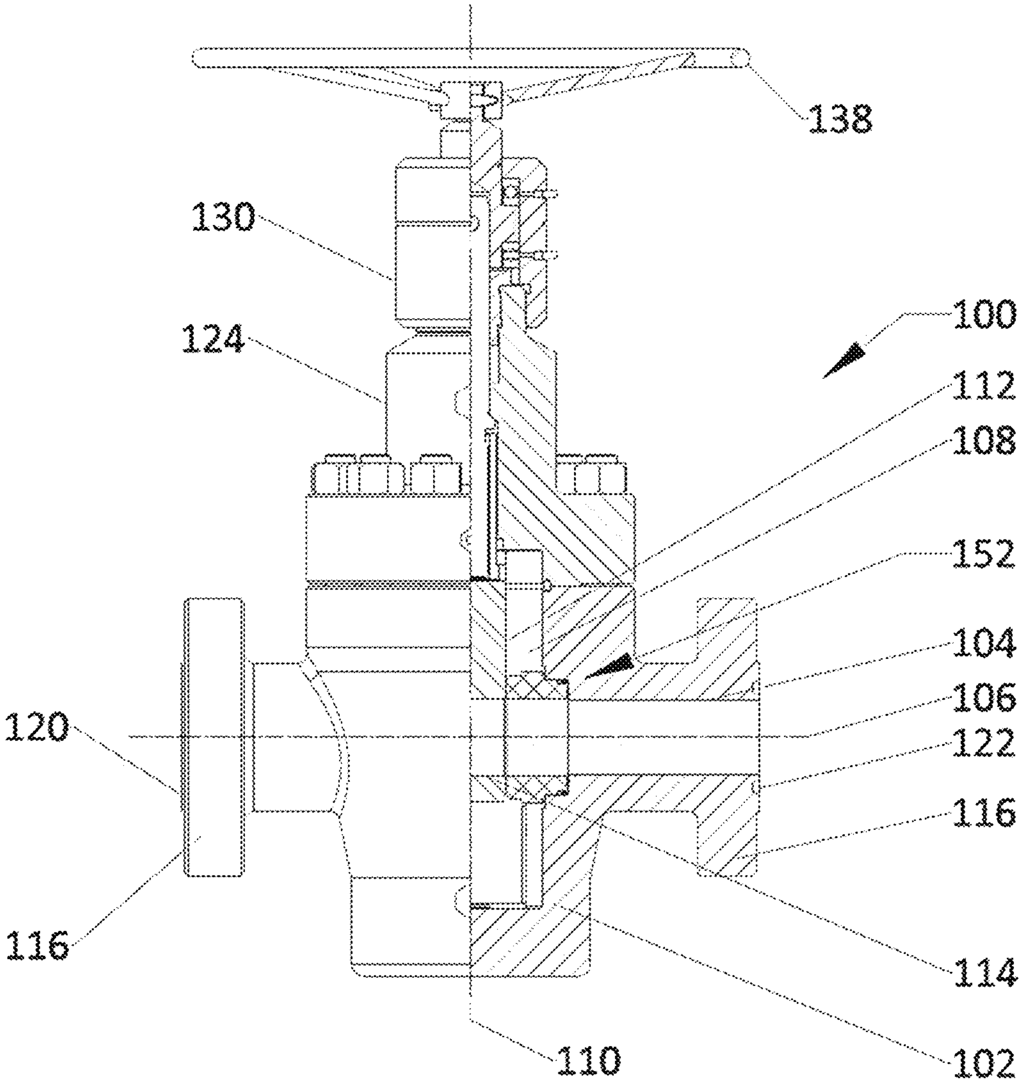
FIG. 1 is a side view of a gate valve in accordance with one embodiment, with the left half of the view illustrating the exterior surface, and with the right half of the view sectioned to illustrate internal structure.

Referring now to the drawings, wherein like reference numbers are used herein to designate like elements throughout, the various views and embodiments of gate valves and seats for a gate valve are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIGS. 1-5 illustrate a gate valve in accordance with one aspect. The gate valve 100 includes a valve body 102 defining a flow bore 104 formed through the valve body for fluid flow along a bore axis 106. Unless otherwise specified, the terms "axial" and "axially" as used herein describe directions parallel to the bore axis 106, and the terms "radial" and "radially" as used herein describe directions towards (i.e., "inwardly radial") and away from (i.e., "outwardly radial") the bore axis and distances measured with respect to the bore axis. The valve body 102 further defines an internal cavity 108 extending along a stem axis 110 perpendicular to the bore axis 106. A gate 112 having a gate bore 114 is mounted in the cavity 108 and is movable along the stem axis 110 to selectively enable or block fluid flow through the flow bore 104. The valve body 102 may further define flanges 116 each end of the flow bore 104 to facilitate connection to other components of the piping system. The first shoulder of the seat 154 is defined by the outwardly radial face 178 and an axial face 179 extending radially outward therefrom at a first corner 184.

Figure 2:
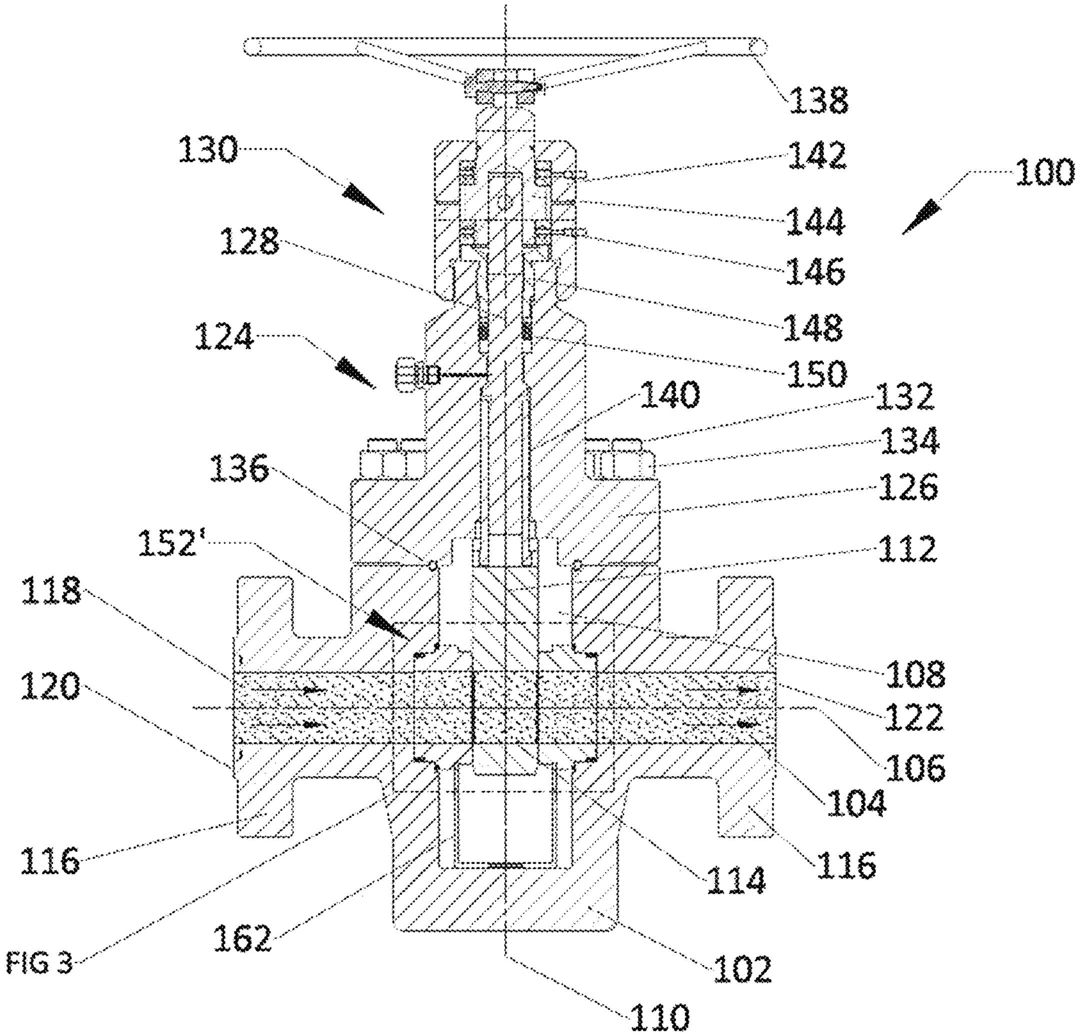
FIG. 2 is a cross-sectional view of the gate valve with the gate in the open position (i.e., "open gate position") allowing a fluid to flow therethrough.
Figure 4:
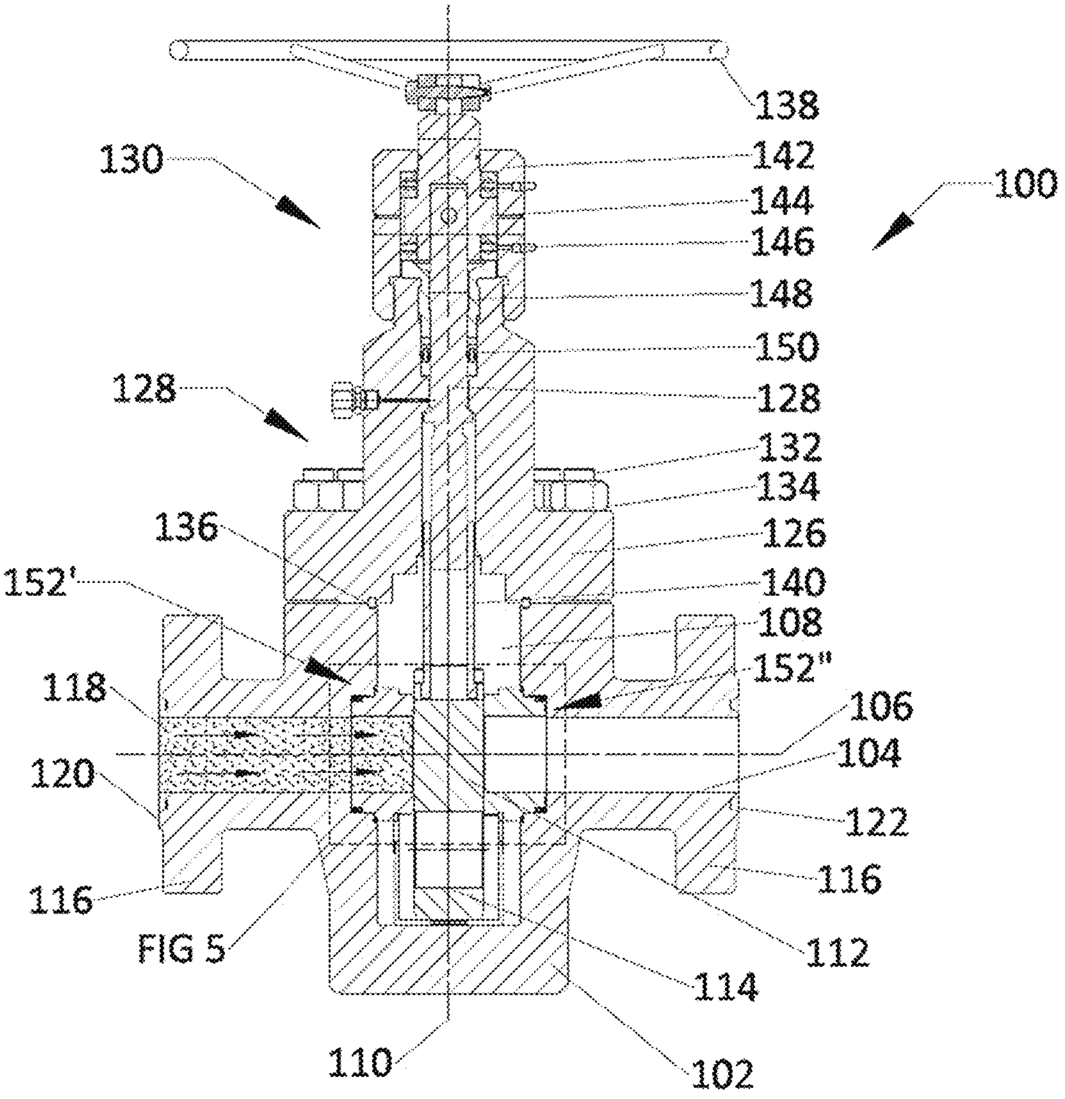
FIG. 4 is a cross-sectional view of the gate valve with the gate in the closed position (i.e., "closed gate position") blocking the fluid from flowing therethrough.

As best seen in FIG. 2, fluid flow through the gate valve 100 is enabled when the gate 112 is positioned along the stem axis 110 such that at least a portion of the gate bore 114 is aligned with at least a portion of the flow bore 104 (i.e., valve in the "open" position). Referring still to FIG. 2, the gate valve 100 in the open position allows a fluid 118 to enter the flow bore 104 from an upstream side 120, pass thorough the aligned gate bore 114, and then exit the gate valve from a downstream side 122. As best seen in FIG. 4, fluid flow through the gate valve 100 is blocked when the gate 112 is positioned such that none of the gate bore 114 is aligned with the flow bore 104 (i.e., valve in the "closed" position). Referring still to FIG. 4, the gate valve 100 in the closed position allows the fluid 118 to enter the fluid bore 104 from the upstream side 120, but further flow past the gate 112 is blocked.

The gate valve 100 further includes a bonnet assembly 124 coupled to the valve body 102. The bonnet assembly 124 includes a bonnet housing 126, an operating stem 128 and a bonnet packing assembly 130. The bonnet housing 126 may serve as a cover to the valve body 102, with the bonnet housing coupled to the valve body using removable fasteners, e.g., threaded studs 132 and threaded nuts 126. A bonnet gasket 136 can be used between to provide a pressure seal between the valve body 102 and the bonnet housing 126. The operating stem 128 extends within the bonnet housing 126 along the stem axis 110 and is operably attached to the gate 112 for selectively moving the gate within the valve body 102. In the illustrated embodiment, the operating stem 128 is operably connected to an external handwheel 138 on an upper end and threadingly engaged to a T-nut 140 on a lower end, the T-nut, in turn, being attached to the gate 112. Selectively rotating the handwheel 138 rotates the connected operating stem 128, and rotation of the operating stem causes the threadingly engaged T-nut 140 to move up and down along the stem axis 110 to move the gate 112 between the open position and the closed position. In alternative embodiments, a powered actuator can be used to move the gate 112.

The bonnet packing assembly 130 can include a packing housing 142, a stem adapter 144 interfacing between the handwheel 138 and the operating stem 128, support bearings 146, a stem packing gland 148 and stem packing and/or stem seal 150 for sealing between the bonnet housing 126. As previously described, the gate valve 100 is configured so as the handwheel 138 is actuated (or some similar operator is actuated), the operating stem 128 is moved so the gate 112 can either close or open the flow bore 104 in the valve body 102. When the gate 112 is in an open position, fluid 118 is allowed to flow through the flow bore 104 (see FIG. 2) in the valve body 102. When the gate 112 is in a closed position, the flow of fluid 118 is blocked within the flow bore 104.

Figure 3:
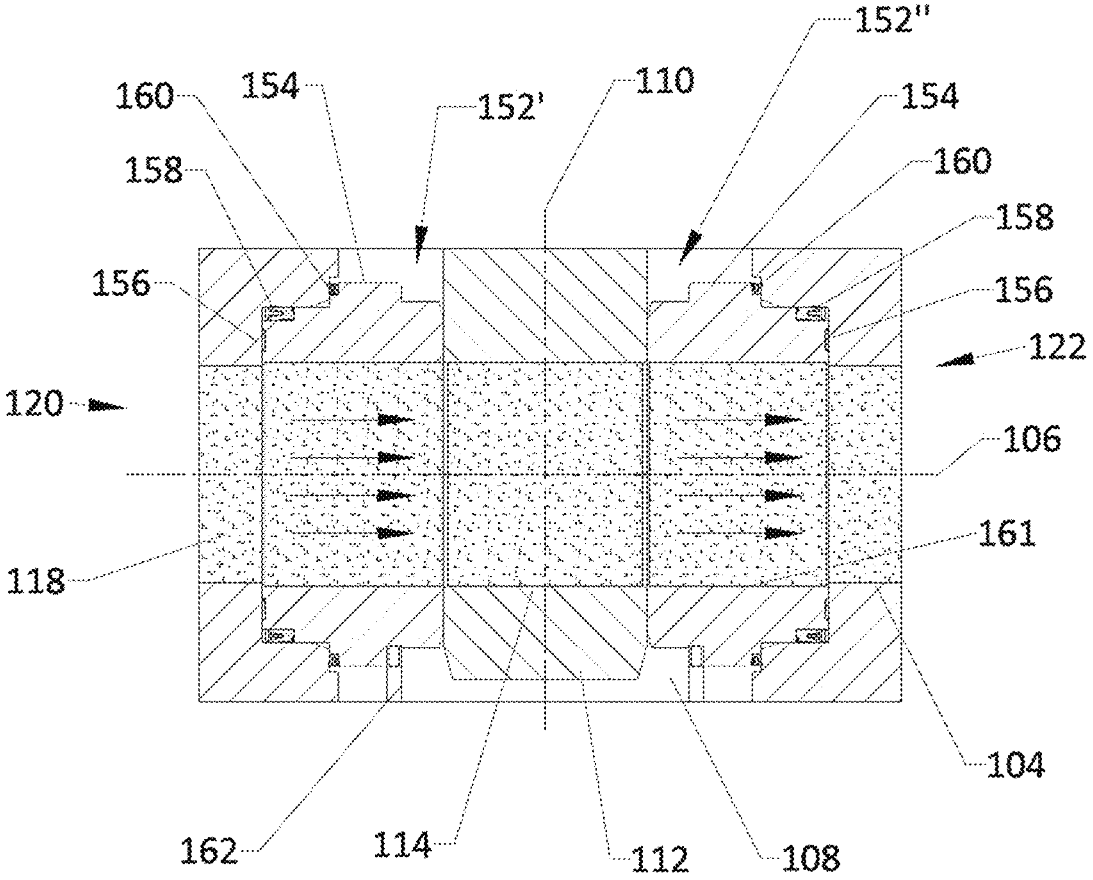
FIG. 3 is an enlarged view of a portion of the gate valve denoted in FIG. 2 illustrating the configuration of the body, gate, seats and seals thereof when the gate is in the open position.
Figure 5:
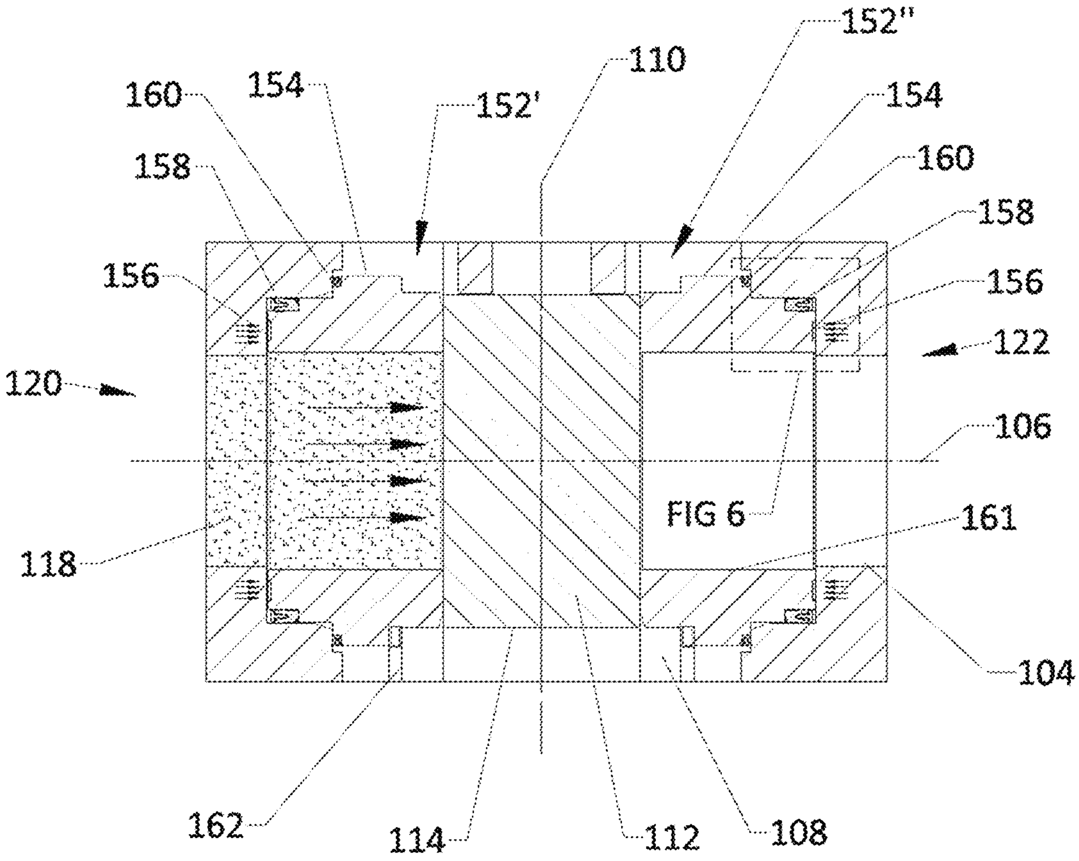
FIG. 5 is an enlarged view of a portion of the gate valve denoted in FIG. 4 illustrating the configuration of the body, gate, seats and seals thereof when the gate is in the closed position.

Referring still to FIGS. 1-5, and especially to FIGS. 3 and 5, a seat assembly 152 is provided on each side of the gate 112 between the valve body 102 and the gate to prevent or lessen leakage of high pressure fluid 118 from the upstream portion of the flow bore 104 into the cavity 108 when the gate is closed. The seat assemblies 152 further prevent or lessen leakage of high pressure fluid 118 from the cavity 108 into the downstream portion of the flow bore 104 when the gate 112 is closed. The gate valve 100 and the seat assembly 152 are configured to be equally resistant to the leakage of pressurized fluid regardless of which flange is on the upstream (i.e., higher pressure) side of the gate 112. In other words, the gate valve 100 is a bidirectional valve such that either the upstream line or the downstream line can be attached to either side 120, 122 of the valve body 102.

FIGS. 3 and 5 provide enlarged illustrations of the seat assemblies 152 with the gate 112 in the open position and the closed position, respectively. For purposes of description, the upstream side of the valve is denoted 120 and the downstream side is denoted 122, thus the seat assembly denoted 152' is the upstream assembly and the seat assembly denoted 152" is the downstream assembly in this example. However, since the gate valve 100 of the illustrated embodiment is bi-directional, the valve would function identically if the pressure and flow direction was reversed.

Figure 7:
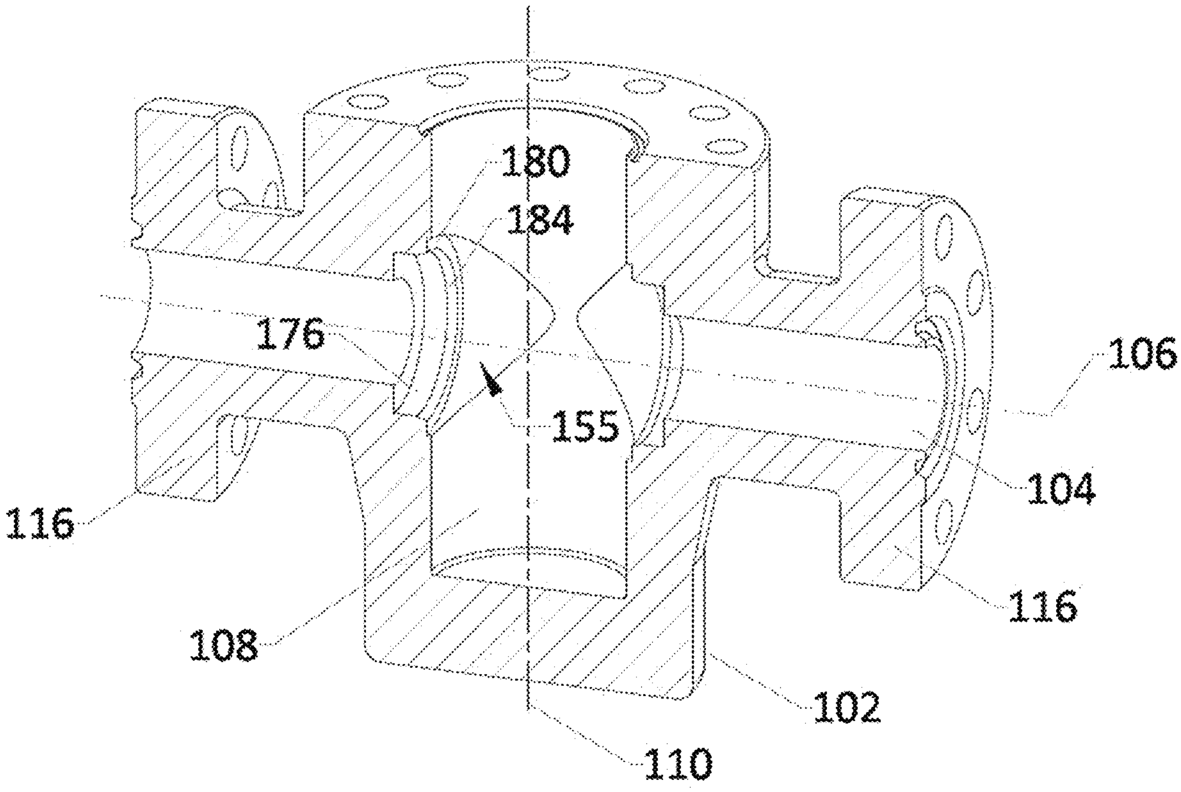
FIG. 7 is a cross sectional perspective view of the gate valve body illustrating the seat and seal surfaces formed therein.

Each seat assembly 152 includes a seat 154, seat spring 156, an upstream seal 158 and a downstream seal 160. Each seat 154 has an annular shape configured fit within a respective pocket 155 (FIG. 7) formed in the valve body 102 on either side of the cavity 108 along the bore axis 106. Each seat 154 further defines a seat bore 161 running therethrough that can be aligned with the flow bore 104. A retainer plate 162 can be provided in the cavity 108 to hold the seats 154 within their respective seat pockets 155. FIG. 3 shows the gate valve 100 in the open position with the gate bore 114 aligned along the bore axis 106 with the seat bores 161 and the flow bore 104 such that pressurized fluid 118 can flow through the gate valve along the bore axis from the upstream side 120 having a higher pressure to the downstream side 122 having a lower pressure. FIG. 5 shows the gate valve 100 in the closed position with the gate bore 114 offset from the bore axis 106 of the flow bore 104 and seat bores 161 such that pressurized fluid 118 from the upstream side 120 cannot flow past the gate 112 along the bore axis.

Figure 6:
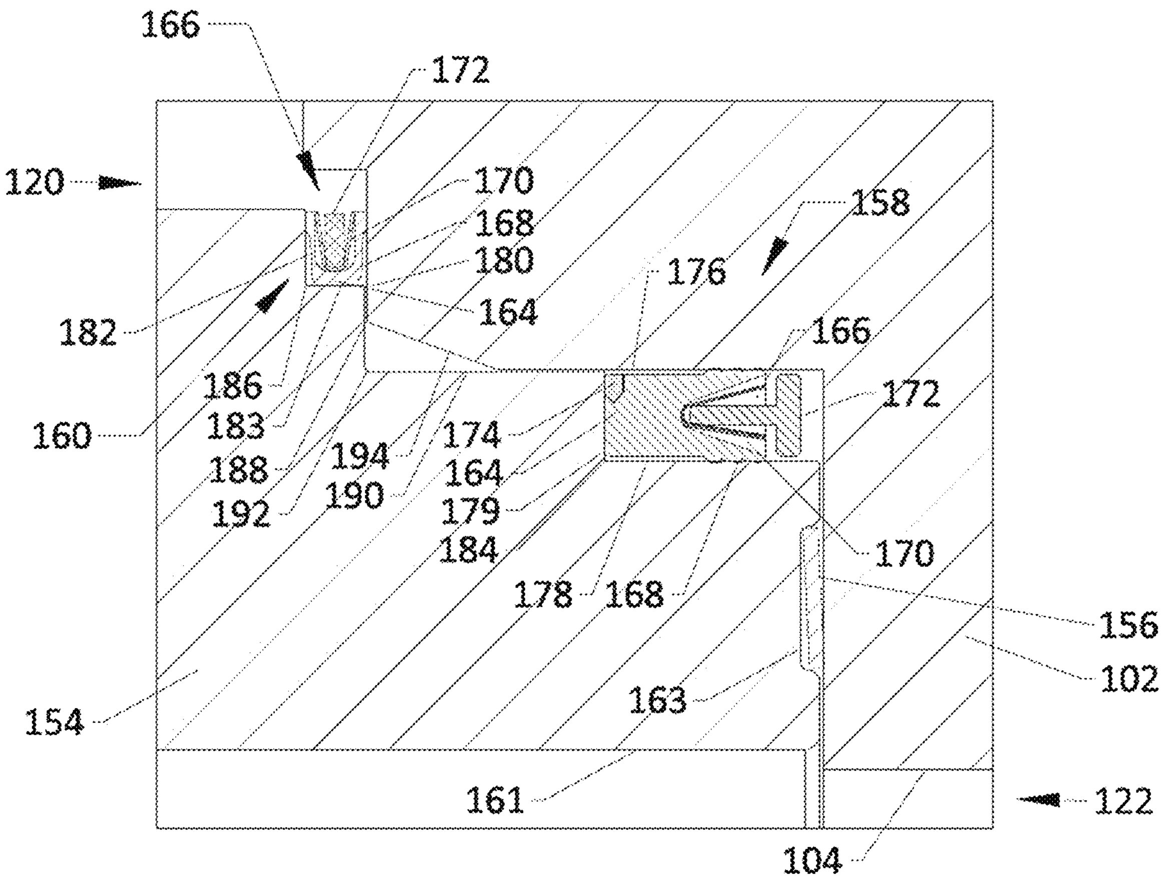
FIG. 6 is a further enlarged view of a portion of the gate valve denoted in FIG. 5 illustrating additional aspects of the body, gate, seats and seals thereof.

Referring now also to FIG. 6, a portion of the downstream seat assembly 152" is further enlarged to better illustrate the configuration of the upstream seal 158, downstream seal 160 and seal spring 156. Although FIG. 6 illustrates the downstream seat assembly 152", the upstream seat assembly 152' can be substantially identical in construction (though reversed in orientation). Also note that the each of the upstream and downstream seat assemblies 152' and 152" includes both the upstream seal 158 and downstream seal 160 for reasons described herein.

The seat springs 156 are annular disk springs disposed in seat spring pockets 163 formed on the outward facing ends of the seats 154 (i.e., the ends facing away from the gate 112). When the seat 154 is pushed into the seat pocket 155, the seat spring 156 is compressed between the inward facing end of the seat pocket and the outward facing end of the seat spring pocket 163, thus biasing the seat inward against the gate 112. This inward biasing of the seat 154 allows the inward facing ends of the seats 112 to maintain contact with the surface of the gate 112 as it moves between the open and closed position.

In preferred embodiments, the upstream seal 158 and the downstream seal 160 are annular seals of the spring energized type. Each seal 158, 160 includes an annular body 164 having a V-shaped or U-shaped concave surface 166 forming a pair of seal lips 168 extending from the body. The seals 158, 160 may be composed of polymer, elastomeric, non-elastomeric, and/or metallic material or some combination thereof and are configured to be suitable to any application depending on the variability of environmental factors such as flow pressure (low/high) and temperature. A V-shaped seal spring 170 is disposed between the seal lips 168 and stabilized by a hat ring 172. A reinforcing ring 174 can be provided in the body 164 of the seal to prevent extrusion of the material due to high pressures or temperatures.

When the seats 154 carrying the seals 158, 160 are installed in the respective seat pockets 155 (FIG. 7) of the valve body 102, the seal springs 170 of the seals are compressed between the respective faces of the seat and the seat pocket. In other words, when installed, each seal spring 170 is pushing outward against the compression, creating an initial upstream seal using spring force to push the seal lips 168 of the upstream seal 158 against an upstream pocket face 176 and an upstream seat face 178, and creating an initial downstream seal using spring force to push the seal lips of the downstream seal 160 outward against a downstream pocket face 180 and a downstream seat face 182. When pressure from pressurized fluid in the gate valve is applied to the concave surface 166 of either seal 158 or 160, the force from the pressure is added to the spring force from the seal spring 170 to increasingly press the seal lips 168 of that respective seal against the respective faces of the seat and seat pocket, thereby preventing leakage of pressure or fluid. These spring energized seals, however, work only when the pressure is applied to the concave surface side of the seal 158, 160; otherwise the pressure and fluid can leak by the seal relatively easily. Thus, to provide a bi-directional seal from pressure coming from either direction of the valve body, the leak-resistant orientation of the seal in the downstream seal 160 is reversed from the leak-resistant orientation of the upstream seal 158.

In the illustrated example, pressure from the upstream side 120 will activate the upstream seal 158' of the upstream seat assembly 152' and stop any leakage if the seal and seat are in good condition. However, if the upstream seal 158' or seat are worn or damaged, pressurized fluid leaking past the upstream seal will be able to pass the downstream seal 160' of that seat assembly and flow into the cavity 108, because the concave surface 166 of the downstream seal is oriented in the wrong direction. Pressurized fluid in the cavity 108 would then enter the downstream seat assembly 152" and activate the downstream seal 160" of the downstream seat assembly. This downstream seal 160" will stop any leakage from the cavity 108 if the seal and seat are in good condition. However, if the downstream seal 160" or seat are worn or damaged, pressurized fluid leaking past the downstream seal will also pass the upstream seal 158" of that seat assembly and flow into the flow bore 104 downstream of the gate 112. In this case, the seats and/or seals will have to be replaced.

Figure 8:
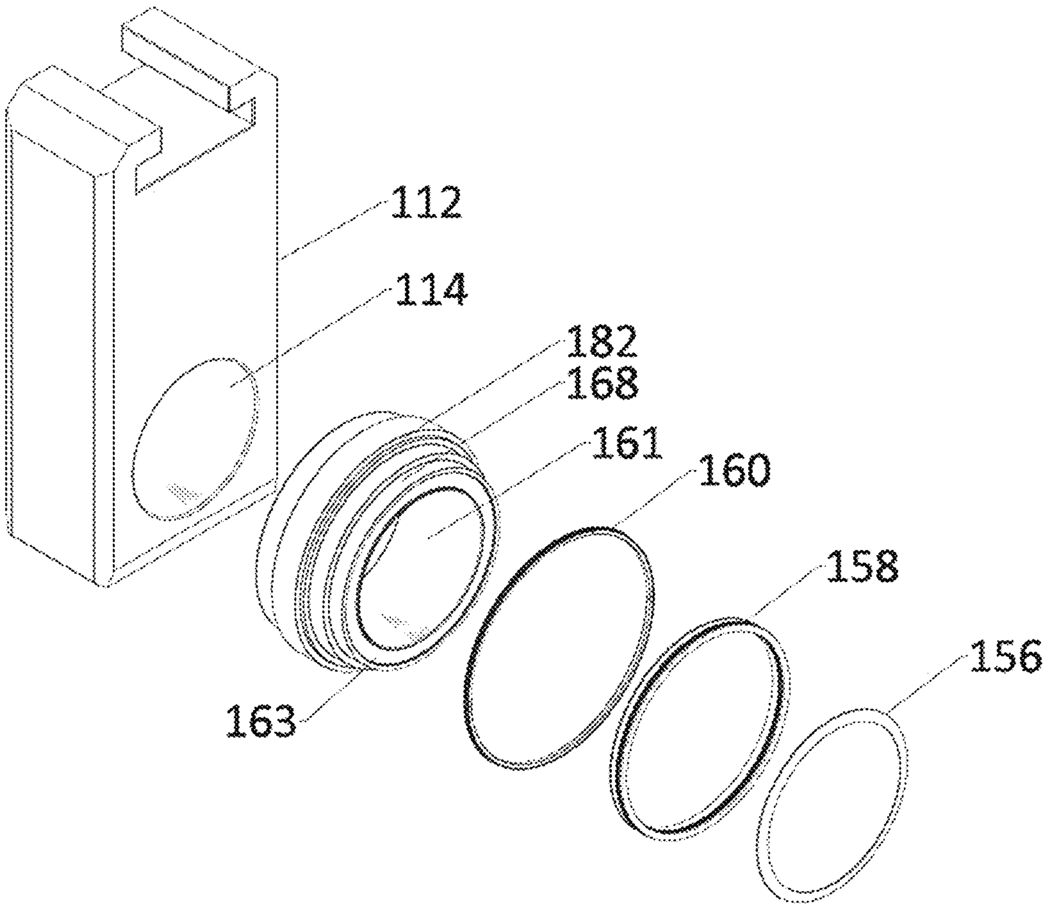
FIG. 8 is an exploded perspective view of the gate, seat and seal components for a gate valve in accordance with further aspects.
Figure 9:
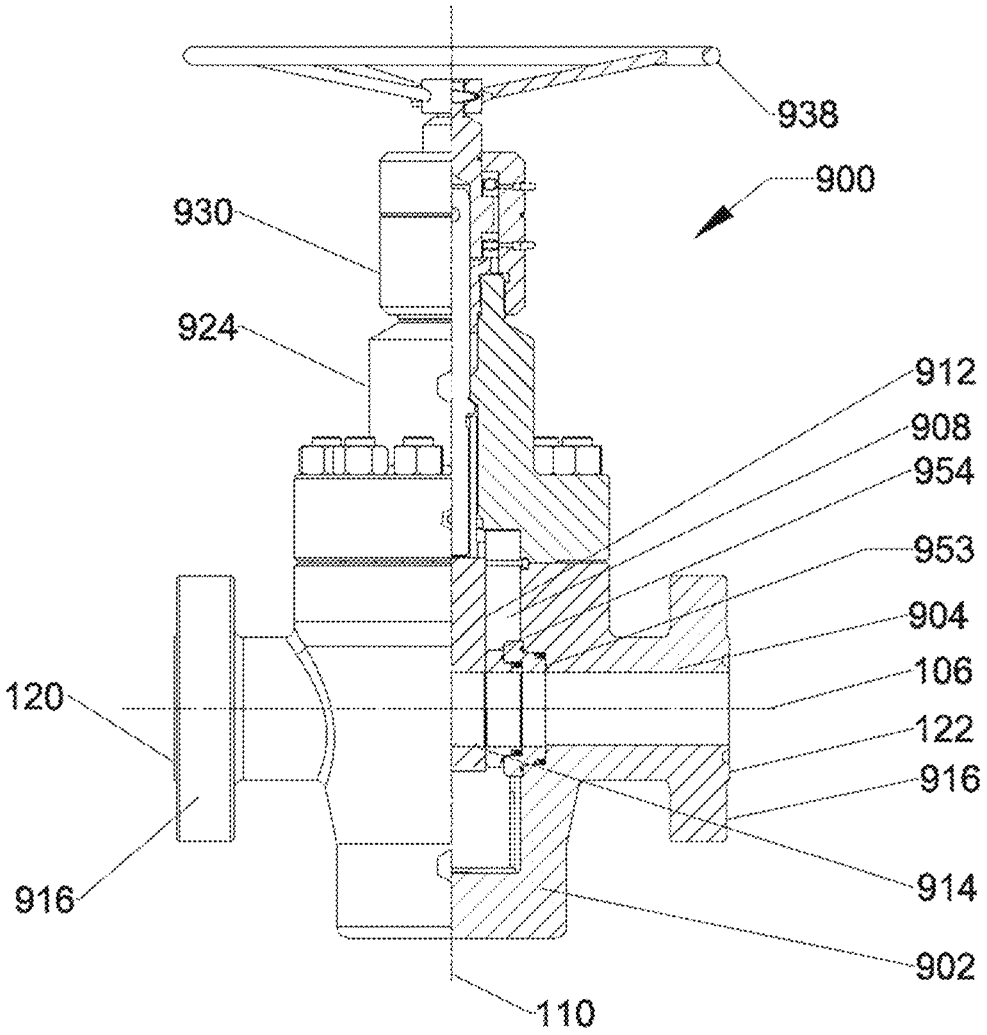
FIG. 9 is a side view of a gate valve in accordance with another embodiment, with the left half of the view illustrating the exterior surface, and with the right half of the view cross-sectioned to illustrate internal structure.

Referring still to FIGS. 1-8, more features of the gate valve 100 are described. As previously discussed, the gate valve 100 comprises a valve body 102 including a cavity 108 in fluid communication with a flow bore 104. As best seen in FIG. 8, the flow bore 104 defines a bore axis 106 passing through the valve body and having a first outer bore portion defined by a first body portion (e.g., left flange 116) on a first side of the cavity and a second outer bore portion defined by a second body portion (e.g., right flange 116) on a second side of the cavity. An annular first seat 154 (e.g., the left seat in FIG. 3) is disposed in a first pocket 155 (best seen in FIG. 8) formed on an inner surface of the first body portion adjacent the cavity 108. The first seat 154 has a seat bore 161 therethrough forming a first inner bore portion of the flow bore 104. The pocket 155 illustrated in FIG. 8 has a cylindrical configuration. An annular second seat 154 (e.g., the right seat in FIG. 3) is disposed in a second pocket 155 formed on an inner surface of the second body portion adjacent the cavity 108. The second seat 154 has a seat bore 161 therethrough forming a second inner bore portion of the flow bore 104. It is preferred, but not required, that the first and second seats 154 are identical in configuration, although reversed in axial orientation. It is similarly preferred, but not required, that the first and second pockets 155 are identical in configuration, although reversed in axial orientation. It is further preferred, but not required, that the seat pockets 155 are cylindrical pockets. A gate 112 is disposed in the cavity 108 between the first seat 154 and the second seat 154 and is movable along a stem axis 110 perpendicular to the bore axis 106 between an open gate position (e.g., FIGS. 2 and 3) and a closed gate position (e.g., FIGS. 4 and 5). When the gate 112 is in the open gate position, a gate bore 114 formed therethrough is aligned with the first inner bore portion and the second inner bore portion respectively, of the first and second seats 154 to allow flow through the valve body 102, and when the gate is in the closed gate position, the gate bore is not aligned with the first inner bore portion and the second inner bore portion to block flow through the valve body. A first upstream seal 158 (e.g., part of the left seat assembly 152') is disposed between a first upstream pair of opposing faces of the first seat 154 and the first pocket 155. The first upstream pair of opposing faces are oriented parallel to the bore axis 106 and the first upstream seal 158 is configured to prevent fluid from moving in a direction from the flow bore 104 into the cavity 108. A first downstream seal 160 is disposed between a first downstream pair of opposing faces of the first seat 154 and the first pocket 155. The first downstream pair of opposing faces are oriented perpendicular to the bore axis 106 and the first downstream seal 160 is configured to prevent fluid from moving in a direction from the cavity 108 into the flow bore 104.

Referring now especially to FIG. 6, in some embodiments, the upstream pair of opposing faces includes an outwardly radial face 178 of a first shoulder of the seat 154 and an inwardly radial face 176 of the pocket 155. Unless otherwise specified, the terms "inwardly radial" and "outwardly radial" as used herein describe directions with respect to the bore axis 106. The first shoulder of the seat 154 is defined by the outwardly radial face 178 and an axial face 179 extending radially outward therefrom at a first corner 184. In the illustrated embodiment, the first shoulder is formed at an axial end of the seat 154 adjacent the body portion 102.

Referring now still to FIG. 6, in some embodiments, the upstream seal 158 is a spring energized seal including a flexible polymeric jacket having a pair of sealing lips 168 extending from a jacket base 164 to form, when viewed in cross section, a V-shaped or a U-shaped cup 166. A metallic energizing spring 170 is disposed in the cup 166 of the jacket between the sealing lips 168 to bias the sealing lips outwards relative to one another against the upstream pair of opposing faces 176, 178. The sealing lips 168 (i.e., the exterior surfaces of the lips) of the upstream seal 158 extend parallel to the bore axis 106 and an opening of the cup between the sealing lips (i.e., on the opposite side from the jacket base 164) faces axially away from the 108 toward the pocket. The upstream seal 158 can include a hat ring 172 extending into the cup 166 to stabilize the spring 170. The upstream seal 158 can include a reinforcing ring 174 around the jacket base 164 to reduce material flow (i.e., "creep") when the seal is pressurized. In the illustrated embodiment, the base of the upstream seal 158 is supported on the axial surface 179 of the first shoulder.

Referring still to FIG. 6, in some embodiments, the downstream pair of opposing faces includes an axial face 182 of a second shoulder formed on the seat 154 and an axial face 180 of the pocket 155. The second shoulder of the seat 154 is defined by an outwardly radial surface 183 of the seat and the axial face 182 extending radially outward therefrom at a second corner 186. In the illustrated embodiment, the outwardly radial surface 178 of the first shoulder and an outwardly radial surface 183 of the second shoulder are disposed at different radial distances from the bore axis 106. In the illustrated embodiment the axial face 182 of the second shoulder faces toward the body portion 102 (i.e., away from the gate 112).

In some embodiments, the downstream seal 160 is a spring energized seal including a flexible polymer jacket having a pair of sealing lips 168 extending from a jacket base 164 to form, when viewed in cross section, a V-shaped or a U-shaped cup 166. A metallic energizing spring 170 is disposed in the cup of the jacket between the sealing lips 168 to bias the sealing lips outwards relative to one another against the downstream pair of opposing faces 180, 182. The sealing lips 168 of the downstream seal 160 are oriented perpendicular to the bore axis 106 and an opening of the cup 166 between the sealing lips faces radially away from the bore axis. In the illustrated embodiment, the base of the downstream seal 160 is supported on the outwardly radial surface 183 of the second shoulder.

As shown in FIG. 6, when the seat 154 carrying the upstream seal 158 and the downstream seal 160 is installed in the pocket 155, i.e., by sliding the seat axially into the pocket, it can be seen that the seat and the pocket are configured to axially compress the sealing lips 168 of the downstream seal between the downstream opposing faces 180, 182 without experiencing sliding contact of either sealing lip across a stationary surface. Eliminating the sliding contact between the sealing lips 168 of the downstream seal 160 and the pocket surfaces during installation greatly reduces the chance for damaging the sealing lips, which can result in leakage and/or failure of the seal.

Referring still to FIG. 6, in some embodiment, the first shoulder and the second shoulder of the seat 154 are separated from one another by at least one axially-oriented intervening surface of the first seat and one radially-oriented intervening surface of the first seat. In the illustrated embodiment, the first shoulder includes radial surface 178 and axial surface 179 joined at a first corner 184, the second shoulder includes radial surface 183 and axial surface 182 joined at a second corner 186, and these two shoulders are separated by an intervening third shoulder including an axially-oriented intervening surface 188 and a radially-oriented intervening surface 190 joined at a third corner 192. Unless otherwise specified, the term "intervening surface" as used herein describes a surface that is disposed between two surfaces of the same element, but is not a linear extension of either of the other surfaces. Thus, the axially oriented surface 188 of the third shoulder of the seat 154 is an intervening surface with respect to the radial surface 183 of the second shoulder and the axial surface 179 of the first shoulder because it is not a linear extension of either of these seat surfaces (i.e., the three surfaces are separated by corners). Similarly, the radially oriented surface 190 of the third shoulder of the seat 154 is an intervening surface with respect to the radial surface 183 of the second shoulder and the axial surface 179 of the first shoulder because it is not a linear extension of either of these seat surfaces.

The configuration of gate valve 100 described herein having the seat 154 with the upstream seat seal surface 178 being parallel to the bore axis 106 and the downstream seat seal surface 182 being perpendicular to the bore axis, and having the corresponding pocket 155 with the upstream pocket seal surface 176 being parallel to the bore axis and the downstream pocket seal surface 180 being perpendicular to the bore axis, addresses a problem commonly encountered in conventional gate valves. Namely, when the upstream and downstream seal surfaces of the seats and/or pockets are aligned in conventional gate valves, a single scratch or gouge on the seat or pocket can damage both the upstream and downstream seal surfaces, thus causing leakage of both the upstream and downstream seals. In contrast, since the gate valve 100 has seats 154 and pockets 155 configured with upstream and downstream respective seal surfaces that are perpendicular to one another, a single scratch or gouge is unlikely to damage both the upstream and downstream seal surfaces, thereby leaving at least one of the two seals undamaged and able to resist leakage.

Further, the configuration of gate valve 100 having the seat 154 with the seat upstream seal surface 178 disposed on a first shoulder and the downstream seal surface 182 disposed on a second shoulder, wherein the two shoulders are separated by an intervening third shoulder, addresses the same previously-described problem commonly encountered in conventional gate valves. Since the upstream and downstream seat seal surfaces 178, 182 are isolated from one another by an intervening shoulder 188, 190 of the seat 154, a single scratch or gouge on the seat is unlikely to damage both the upstream and downstream seat seal surfaces.

Referring still to FIG. 6, in some embodiment, the inwardly radial face 176 of the pocket 155 (i.e., that opposes the outwardly radial surface 178 of the seat's first shoulder) and the axial face 180 of the pocket (i.e., that opposes the axial surface 182 of the seat's second shoulder) are separated from one another by at least one intervening surface of the pocket that is not perpendicular to the bore axis 106 and is not parallel to the bore axis. In the illustrated embodiment, the inwardly radial face 176 and the axial face 180 are separated by an intervening angled surface 194 that is neither perpendicular nor parallel to the bore axis 106. The configuration of the pocket 155 having the pocket upstream seal surface 176 and the pocket downstream seal surface 180 isolated by an intervening angled surface protects against damage to the upstream and downstream pocket seal surfaces.

Referring now back to FIGS. 3 and 5, in another embodiment, the gate valve 100 further comprises a second upstream seal 158 (e.g., part of the right seat assembly 152") disposed between a second upstream pair of opposing faces of the second seat 154 (i.e., the right seat) and the second pocket 155 (i.e., the right pocket). The second upstream pair of opposing faces are oriented parallel to the bore axis 106. The second upstream seal 158 is configured to prevent fluid from moving in a direction from the flow bore 104 into the cavity 108. A second downstream seal 160 is disposed between a second downstream pair of opposing faces of the second seat 154 and the second pocket 155. The second downstream pair of opposing faces are oriented perpendicular to the bore axis 106, wherein the second downstream seal is configured to prevent fluid from moving in a direction from the cavity 108 into the flow bore 104.

Referring still to FIGS. 3 and 5, in another embodiment, the second upstream pair of opposing faces includes a outwardly radial face of a first shoulder formed at an axial end of the second seat 154 adjacent the second body portion 102 and an inwardly radial face of the second pocket 155. The second downstream pair of opposing faces can include an axial face of a second shoulder formed on the second seat 154 facing toward the second body portion 102. Outward radial surfaces of the first shoulder and the second shoulder of the second seat 154 can be disposed at different radial distances from the bore axis 106, and axial surfaces of the first shoulder and the second shoulder of the second seat can be disposed at different axial distances from the axial end of the second seat adjacent to the first body portion. The second downstream pair of opposing faces can also include an axial face of the second cylindrical pocket 155 facing toward the cavity 108 (i.e., towards the gate 112).

Referring once again to FIG. 6, in one embodiment, a first seat face 178 that is one of the first upstream pair of opposing faces 176, 178 and a second seat face 182 that is one of the first downstream pair of opposing faces 180, 182 are disposed on different faces of the seat 154. A first pocket face 176 that is one of the first upstream pair of opposing faces 176, 178 and a second pocket face 180 that is one of the first downstream pair of opposing faces 180, 182 are disposed on different faces of the first pocket 155.

Referring now to FIGS. 3 and 5-8, in another aspect, a seat assembly 152 for a gate valve 100 is configured for mounting in a pocket 155 formed on an inner surface of a gate valve body 102. The seat assembly 152 comprises a seat 154, an upstream seal 158 and a downstream seal 160. The seat 154 has a seat bore 161 formed therethrough from a pocket side to a gate side defining a bore axis 106, a first shoulder 178, 179 for mounting an upstream seal 158 and a second shoulder 182, 183 for mounting a downstream seal 160. The first shoulder includes a first outwardly radial face 178 disposed at a first radius from the bore axis 106 and extending axially from a first position at a first distance relative to the pocket side 122 of the seat 154 to a first corner 184 disposed at a second distance relative to the pocket side, the second distance being greater than the first distance. The first shoulder further includes a first axial face 179 extending radially outward from the first corner 184 to a second radius from the bore axis 106, the second radius being greater than the first radius. The second shoulder includes a second outwardly radial face 183 disposed at a third radius from the bore axis and extending axially from a second position at a third distance relative to the pocket side 122 of the seat 154 to a second corner 186 disposed at a fourth distance relative to the pocket side, the fourth distance being greater than the third distance. The second shoulder further includes a second axial face 182 extending radially outward from the second corner 186 to a fourth radius from the bore axis, the fourth radius being greater than the third radius. The upstream seal 158 is adapted for mounting on the first shoulder to prevent fluid flow in an axial direction from the pocket side 122 toward the gate side. The downstream seal 160 is adapted for mounting on the second shoulder to prevent fluid flow in a radial direction toward the bore axis 106.

The annular seat 154 of the seat assembly 152 can further comprises a third shoulder 188, 190 disposed axially between the first shoulder 178, 179 and the second shoulder 182, 183. In some embodiments, the third shoulder 188, 190 includes a third outwardly radial face 190 disposed at the second radius from the bore axis 106 and extending axially to a third corner 192, the third corner disposed axially between the first corner and the second corner, and a third axial face 188 extending radially outward from the third corner. In some embodiments, the third corner 188, 190 is disposed at the third distance from the pocket side 122 and the third axial face 188 extends radially outward from the third corner 192 to the third radius from the bore axis 106.

As best seen in FIG. 6, in some embodiments of the seal assembly 152, the upstream seal 158 is a spring energized seal including a flexible polymeric jacket having a pair of sealing lips 168 extending from a jacket base 164 to form, when viewed in cross section, a V-shaped or a U-shaped cup 166. A metallic energizing spring 170 is disposed in the cup 166 of the jacket between the sealing lips 168 to bias the sealing lips outwards relative to one another. The jacket base 164 of the upstream seal 158 is configured to mount against the first axial face 179 of the first shoulder and one of the pair of sealing lips 168 of the upstream seal is configured to mount against the first outwardly radial face 178 of the first shoulder.

In some embodiments, the downstream seal 160 is a spring energized seal including a flexible polymeric jacket having a pair of sealing lips 168 extending from a jacket base 164 to form, when viewed in cross section, a V-shaped or a U-shaped cup 166. A metallic energizing spring 170 is disposed in the cup 166 of the jacket between the sealing lips 168 to bias the sealing lips outwards relative to one another. The jacket base 164 of the downstream seal 160 is configured to mount against the second outwardly radial face 183 of the second shoulder and one of the pair of sealing lips 168 of the downstream seal is configured to mount against the second axial face 182 of the second shoulder.

Referring now again to FIGS. 3 and 5-8, in yet another aspect, a seat 154 for a gate valve is configured for mounting in a pocket 155 formed on an inner surface of a gate valve body 102. The seat 154 comprises an annular body having a seat bore 161 formed therethrough from a pocket side to a gate side defining a bore axis 106, a first shoulder 178, 179 configured for mounting an upstream seal 158 and a second shoulder 182, 183 configured for mounting a downstream seal 160. The first shoulder includes a first outwardly radial face 178 disposed at a first radius from the bore axis 106 and extending axially from a first position at a first distance relative to the pocket side 122 of the seat 154 to a first corner 184 disposed at a second distance relative to the pocket side, the second distance being greater than the first distance. The first shoulder also includes a first axial face 179 extending radially outward from the first corner 184 to a second radius from the bore axis 106, the second radius being greater than the first radius. The second shoulder includes a second outwardly radial face 183 disposed at a third radius from the bore axis 106 and extending axially from a second position at a third distance relative to the pocket side 122 of the seat 154 to a second corner 186 disposed at a fourth distance relative to the pocket side, the fourth distance being greater than the third distance. The second shoulder also includes a second axial face 182 extending radially outward from the second corner to a fourth radius from the bore axis 106, the fourth radius being greater than the third radius.

In some embodiments, the annular seat 154 further comprises a third shoulder 188, 190 disposed axially between the first shoulder 178, 179 and the second shoulder 182, 183. The third shoulder includes a third outwardly radial face 190 disposed at the second radius from the bore axis 106 and extending axially to a third corner 192, the third corner disposed axially between the first corner 184 and the second corner 186. The third shoulder also includes a third axial face 188 extending radially outward from the third corner 192. In some embodiments, the third corner 192 is disposed at the third distance from the pocket side 122 and the third axial 188 face extends radially outward from the third corner to the third radius from the bore axis.

FIGS. 9-15 illustrate a gate valve having a dual seat arrangement in accordance with another aspect. The gate valve 900 includes a valve body 902 defining a flow bore 904 formed through the valve body for fluid flow along a bore axis 106. The terms "axial" and "axially" as used herein describe directions parallel to the bore axis 106, and the terms "radial" and "radially" as used herein describe directions towards (i.e., "inwardly radial") and away from (i.e., "outwardly radial") the bore axis and distances measured with respect to the bore axis. The valve body 902 further defines an internal cavity 908 extending along a stem axis 110 perpendicular to the bore axis 106. A gate 912 having a gate bore 914 is mounted in the cavity 908 and is movable along the stem axis 110 to selectively enable or block fluid flow through the flow bore 904. The valve body 902 may further define flanges 916 at each end of the flow bore 904 to facilitate connection to other components of the piping system. A dual seat assembly 952 comprising a seat retainer 953, a seat 954 and associated seals and springs (as further described), is disposed on each respective side of the gate 912 along the flow bore 904 between the gate and a respective inner surface of the valve body 902. In typical embodiments, the seats 954 and seat retainers 953 are formed of metallic materials or metallic alloy materials including, but not limited to carbon steel, steel alloys, corrosion resistant alloy (CRA) and other high strength, wear-resistant materials. In typical embodiments, the associated seals have sealing surfaces formed of non-metallic materials including, but not limited to polymers, natural and synthetic elastomers, non-elastomeric plastics and other flexible non-metallic materials. In some embodiments, the associated seals can have internal metallic components that serve to energize or reinforce the external non-metallic sealing surfaces.

Figure 10:
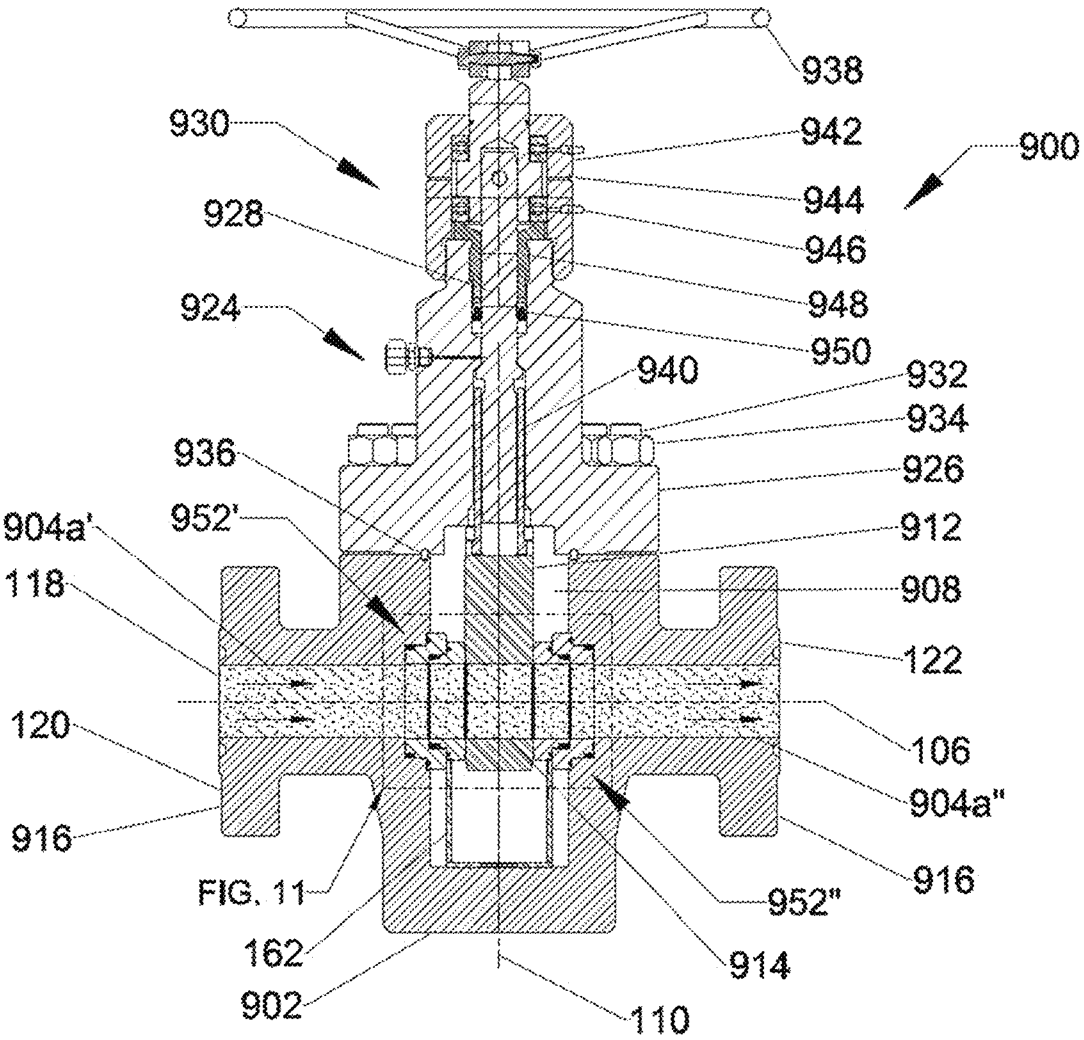
FIG. 10 is a full cross-sectional view of the gate valve of FIG. 9 with the gate in the open position allowing a fluid to flow therethrough.
Figure 12:
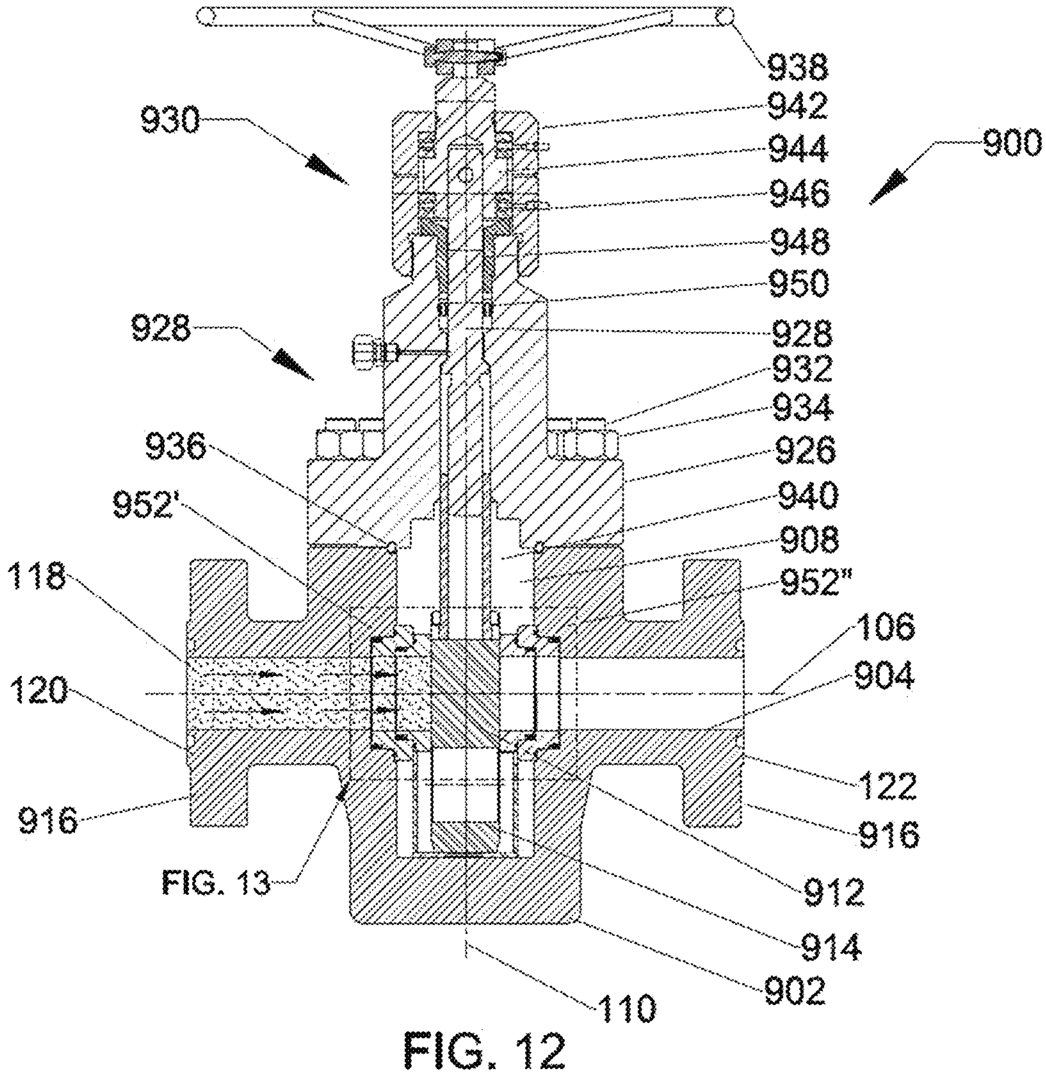
FIG. 12 is a cross-sectional view of the gate valve of FIG. 9 with the gate in the closed position blocking the fluid from flowing therethrough.

As best seen in FIG. 10, fluid flow through the gate valve 900 is enabled when the gate 912 is positioned along the stem axis 110 such that at least a portion of the gate bore 914 is aligned with at least a portion of the flow bore 904 (i.e., valve in the "open" position). Referring still to FIG. 10, the gate valve 900 in the open position allows a fluid 118 to enter the flow bore 904 from an upstream side 120, pass thorough the aligned gate bore 914, and then exit the gate valve from a downstream side 122. As best seen in FIG. 12, fluid flow through the gate valve 900 is blocked when the gate 912 is positioned such that none of the gate bore 914 is aligned with the flow bore 904 (i.e., valve in the "closed" position). Referring still to FIG. 12, the gate valve 900 in the closed position allows the fluid 118 to enter the fluid bore 904 from the upstream side 120, but flow past the gate 112 is blocked.

The gate valve 900 further includes a bonnet assembly 924 coupled to the valve body 902. The bonnet assembly

924 includes a bonnet housing 926, an operating stem 928 and a bonnet packing assembly 930. The bonnet housing 926 may serve as a cover to the valve body 902, with the bonnet housing coupled to the valve body using removable fasteners, e.g., threaded studs 932 and threaded nuts 934. A bonnet gasket 936 can be used between to provide a pressure seal between the valve body 902 and the bonnet housing 934. The operating stem 928 extends within the bonnet housing 926 along the stem axis 110 and is operably attached to the gate 912 for selectively moving the gate within the valve body 902. In the illustrated embodiment, the operating stem 928 is operably connected to an external handwheel 938 on an upper end and threadingly engaged to a T-nut 940 on a lower end, the T-nut, in turn, being attached to the gate 912. Selectively rotating the handwheel 938 rotates the connected operating stem 928, and rotation of the operating stem causes the threadingly engaged T-nut 940 to move up and down along the stem axis 110 to move the gate 912 between the open position and the closed position. In alternative embodiments, a powered actuator can be used to move the gate 912.

The bonnet packing assembly 930 can include a packing housing 942, a stem adapter 944 interfacing between the handwheel 938 and the operating stem 928, support bearings 946, a stem packing gland 948 and stem packing and/or stem seal 950 for sealing between the stem and the bonnet housing 926. As previously described, the gate valve 900 is configured so as the handwheel 938 is actuated (or some similar operator is actuated), the operating stem 928 is moved so the gate 912 can either close or open the flow bore 904 in the valve body 902. When the gate 912 is in an open position, fluid 118 is allowed to flow through the flow bore 904 (see FIG. 10) in the valve body 902. When the gate 912 is in a closed position, the flow of fluid 118 is blocked within the flow bore 904.

Referring now in particular to FIG. 10, a dual seat assembly 952 is provided on each side of the gate 912 between the valve body 902 and the gate. The dual seat assemblies 952 constitute removable wear elements that can be replaced when they become eroded, worn or damaged without replacing the entire valve body 902. For example, FIG. 10 shows a first dual seat assembly 952' disposed on the first side of the gate 912 and a second dual seat assembly 952" disposed on the second side of the gate. The dual seat assemblies 952 include fluid seals to prevent or lessen so-called “upstream leakage”, i.e., leakage of high-pressure fluid 118 from the upstream portion of the flow bore 904 into the cavity 908 when the gate is closed. The dual seat assemblies 952 further include separate fluid seals to prevent or lessen so-called “downstream leakage”, i.e., leakage of high-pressure fluid 118 from the cavity 908 into the downstream portion of the flow bore 904 when the gate 912 is closed. The gate valve 900 and the seat assemblies 952 may be configured to be equally resistant to the leakage of pressurized fluid regardless of which flange is on the upstream (i.e., higher pressure) side of the gate 912. In other words, the gate valve 900 can be a bidirectional valve such that either the upstream line or the downstream line can be attached to either side 120, 122 of the valve body 902.

Referring again to FIGS. 9-15, further details of the dual seat assemblies 952 are disclosed. As previously discussed, the gate valve 900 includes a valve body 902 having the cavity 908 in fluid communication with a flow bore 904. The flow bore 904 defines a bore axis 106 through the valve body 902 having a first outer bore portion, denoted 904*a*' (FIG. 10), defined by a first body portion on a first side of the cavity 908, and a second outer bore portion, denoted 904*a*" (FIG. 10), defined by a second body portion on a second side of the cavity. Each respective dual seat assembly 152 comprises a respective annular seat retainer 953 and a respective annular seat 954 disposed on a respective side of the gate 912. Thus, as shown in FIG. 11, a first dual seat assembly 952' comprises a first seat retainer 953' and a first seat 954' disposed on the first side of the gate 912, and a second dual seat assembly 952" comprises a second seat retainer 953" and a second seat 954" disposed on the second side of the gate.

Figure 11:
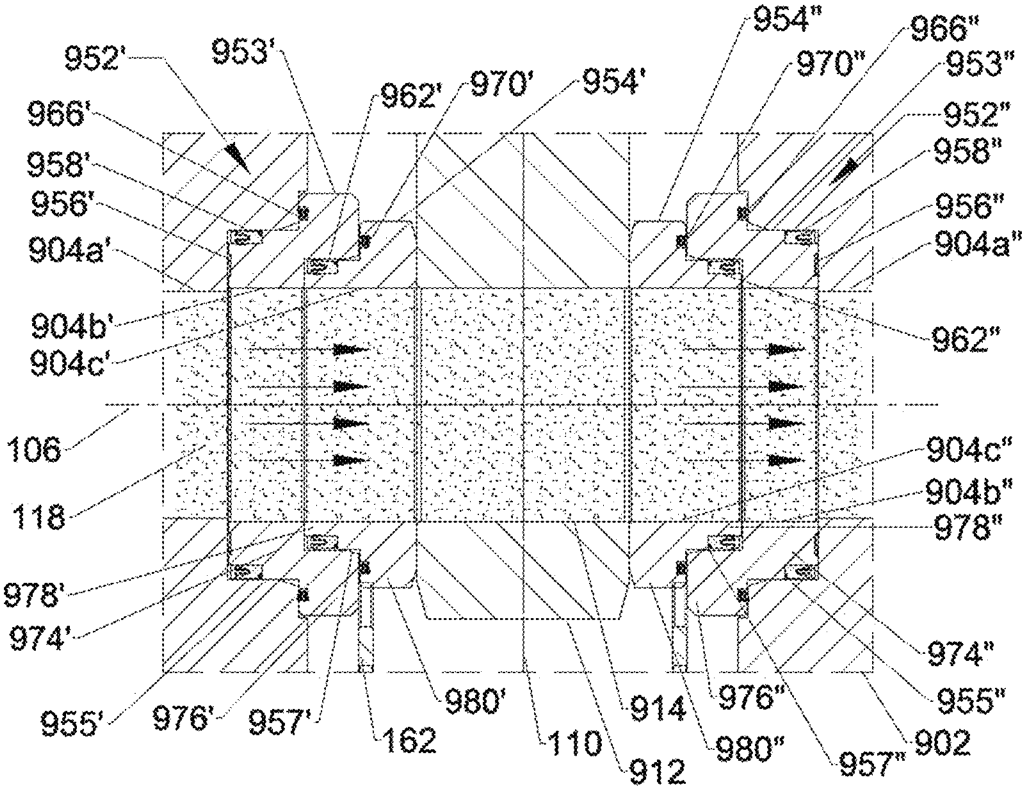
FIG. 11 is an enlarged cross-sectional view of a portion of the gate valve denoted in FIG. 10 illustrating the configuration of the body, gate, seats, seat retainers and seals thereof when the gate is in the open position.

Referring, e.g., to FIG. 11, each respective seat retainer 953 has an annular configuration defining a retainer wall portion 974 having a relatively-smaller outer radius extending from a retainer rim portion 976 having a relatively-larger outer radius, with a retainer bore extending through both portions forming a respective intermediate bore portion 904*b* of the flow bore 904. Thus, the retainer bore of first seat retainer 953' forms the first intermediate bore portion 904*b*', and the retainer bore of second seat retainer 953" forms the second intermediate bore portion 904*b*". Each respective seat 954 has an annular configuration defining a seat wall portion 978 having a relatively-smaller outer radius extending from a seat rim portion 980 having a relatively-larger outer radius, with a seat bore of constant inner radius extending through both portions forming a respective inner bore portion 904*c* of the flow bore 904. Thus, the seat bore of first seat 954' forms the first inner bore portion 904*c*', and the seat bore of second seat 954" forms the second inner bore portion 904*c*".

The gate 912 is disposed in the cavity 908 between the first seat 954' and the second seat 954" and is movable along the stem axis 110 (which is perpendicular to the bore axis 106) between an open gate position and a closed gate position. For example, when the gate 912 is in the open gate position (e.g., FIGS. 10, 11), the gate bore 914 formed therethrough is aligned with the first portion of the bore 904 including the first outer bore portion 904*a*', first intermediate bore portion 904*b*' and first inner bore portion 904*c*' and with the second portion of the bore including the second inner bore portion 904*c*", second intermediate bore portion 904*b*" and second outer bore portion 904*a*", to allow flow 118 through the valve body 902. When the gate 912 is in the closed gate position (e.g., FIGS. 12, 13), the gate bore 914 is not aligned with first and second portions of the flow bore 904, thus blocking fluid flow through the valve body 902.

An axially outward facing end (i.e., facing away from the gate 912) of the wall portion 974 of each respective seat retainer 953 is received in a respective retainer pocket 955 (see, e.g., FIG. 15) formed in the axially inward facing side (i.e., facing toward the gate) of the gate valve body portion 902 along the bore axis 106, with the axially outward facing surface of the rim portion 976 of the seat retainer abutting the body portion surrounding to the retainer pocket. Thus, as shown in FIG. 11, a first seat retainer 953' is received in a first retainer pocket 955' formed on an inward facing surface of the first body portion, and a second seat retainer 953" is received in a second retainer pocket 955" formed on an inward facing surface of the second body portion. An axially outward end of the wall portion 978 of each respective seat 954 is received in a seat pocket 957 formed in the axially inward facing side of the respective seat retainer 953 along the bore axis 106, with the axially outward facing surface of the rim portion 980 of the seat abutting the axially inward facing surface of the rim portion 976 of the seat retainer. Thus, the outward facing wall portion 978' of the first seat 954' is received in a first seat pocket 957' formed on an inward facing surface of the first seat retainer 953', with the outward facing wall portion 974' of the first seat retainer received in the first retainer pocket 955' formed on an inward facing surface of the valve body 902. Similarly, the outward facing wall portion 978" of the second seat 954" is received in a second seat pocket 957" formed on an inward facing surface of the second seat retainer 953", with the outward facing wall portion 974" of the second seat retainer received in the second retainer pocket 955" formed on a second inward facing surface of the valve body 902.

Figure 13:
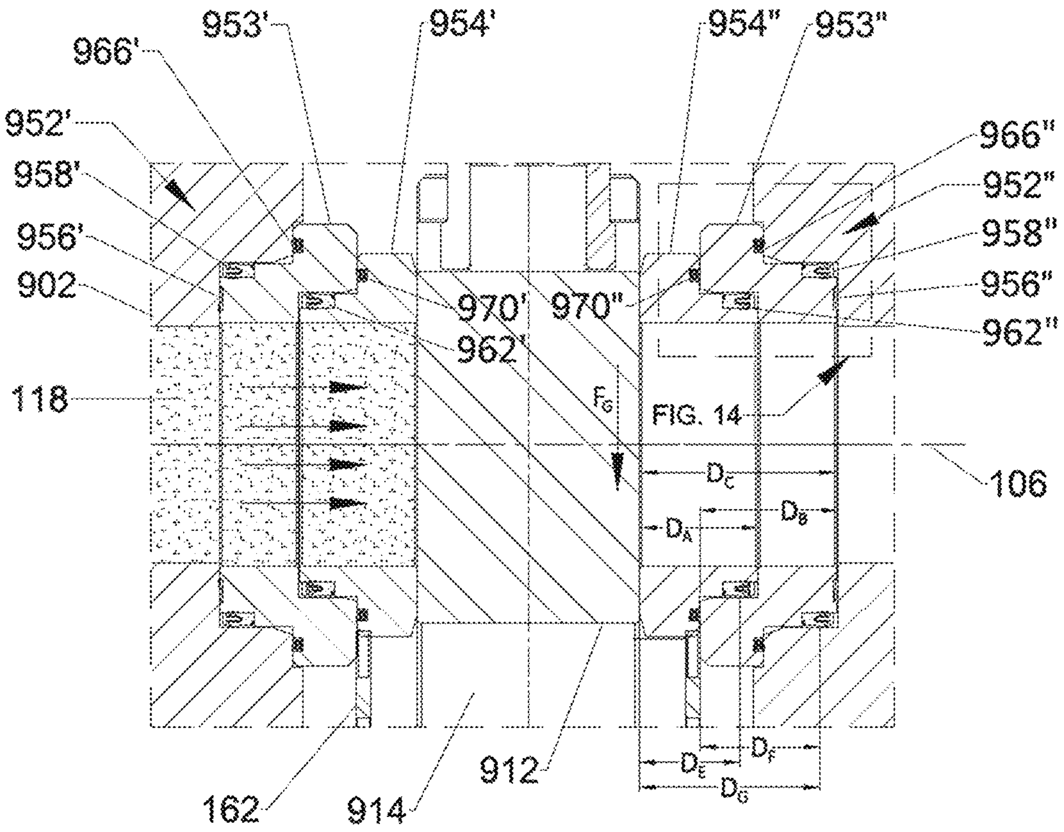
FIG. 13 is an enlarged cross-sectional view of a portion of the gate valve denoted in FIG. 12 illustrating the configuration of the body, gate, seats, seat retainers and seals thereof when the gate is in the closed position.

As best seen in FIGS. 11 and 13, each respective dual seat assembly 952 further comprises a respective first pair of fluid seals disposed along an outer interface between the seat retainer 953 and the valve body 902 to block fluid leakage along the outer interface, and a respective second pair of fluid seals disposed along an inner interface between the seat retainer 953 and the seat 954 to block fluid leakage along the inner interface. In the context of this disclosure, the term “interface” refers to the boundary between respective discrete elements, e.g., between a seat and a seat pocket, where opposing surfaces come into contact with, or close proximity to, one another, but where the opposing surfaces are not permanently attached to one another. In the absence of seals, fluids can leak along interfaces when a pressure differential is present between opposite ends of the interface. In particular, the first pair of fluid seals includes a retainer upstream seal 958 and a retainer downstream seal 966 disposed along the outer interface between the seat retainer 953 and the valve body 902, and the second pair of fluid seals includes a seat upstream seal 962 and a seat downstream seal 970 disposed along the inner interface between the seat retainer 953 and the seat 954. In the context of the upstream seals 958 and 962 and the downstream seals 966 and 970, the terms “upstream” and “downstream” do not relate to the location of the seals relative to which end of the gate valve 900 is actually pressurized. Rather, the term “upstream seal” is used to denote seals configured to restrict the flow of pressurized fluid 118 moving in a direction from the flow bore 904 toward the cavity 908, whereas the term “downstream seal” is used to denote seals configured to restrict the flow of pressurized fluid moving in a direction from the cavity towards the flow bore.

The respective orientations of the upstream and downstream seals 958, 960, 962, 966 refers to the respective direction of fluid flow that each respective seal is configured to block. For example, in the illustrated embodiment of FIGS. 9-15, the retainer upstream seal 958 is configured to block fluid flow along an axial portion of the outer interface, and thus is considered to have an axial orientation. Similarly, the seat upstream seal 962 is configured to block fluid flow along an axial portion of the inner interface, and this is also considered to have an axial orientation. On the other hand, in the illustrated embodiment, the retainer downstream seal 966 is configured to block fluid flow along a radial portion of the outer interface, and thus is considered to have a radial orientation. Similarly, the seat downstream seal 970 is configured to block fluid flow along a radial portion of the inner interface, and this is also considered to have a radial orientation.

In some embodiments, the upstream seals of each dual seat assembly 952 are oriented perpendicular to the downstream seals in both pairs of the fluid seals. E.g., retainer upstream seal 958 is oriented perpendicular to retainer downstream seal 966, and seat upstream seal 962 is oriented perpendicular to seat downstream seal 970. In some embodiments, both upstream seals of each dual seat 952 assembly have the same orientation as one another, and both downstream seals have the same orientation as one another, but different from that of the upstream seals. E.g., retainer upstream seal 958 and seat upstream seal 962 have the same first orientation as each other, and retainer downstream seal 966 and seat downstream seal 970 have the same second orientation as each other, but different from the first orientation of the two upstream seals. In some embodiments, both upstream seals 958, 962 of each dual seat assembly 952 are oriented axially (i.e., parallel to the bore axis 106), and both downstream seals 966, 970 are oriented radially (i.e., perpendicular to the bore axis).

Figure 14:
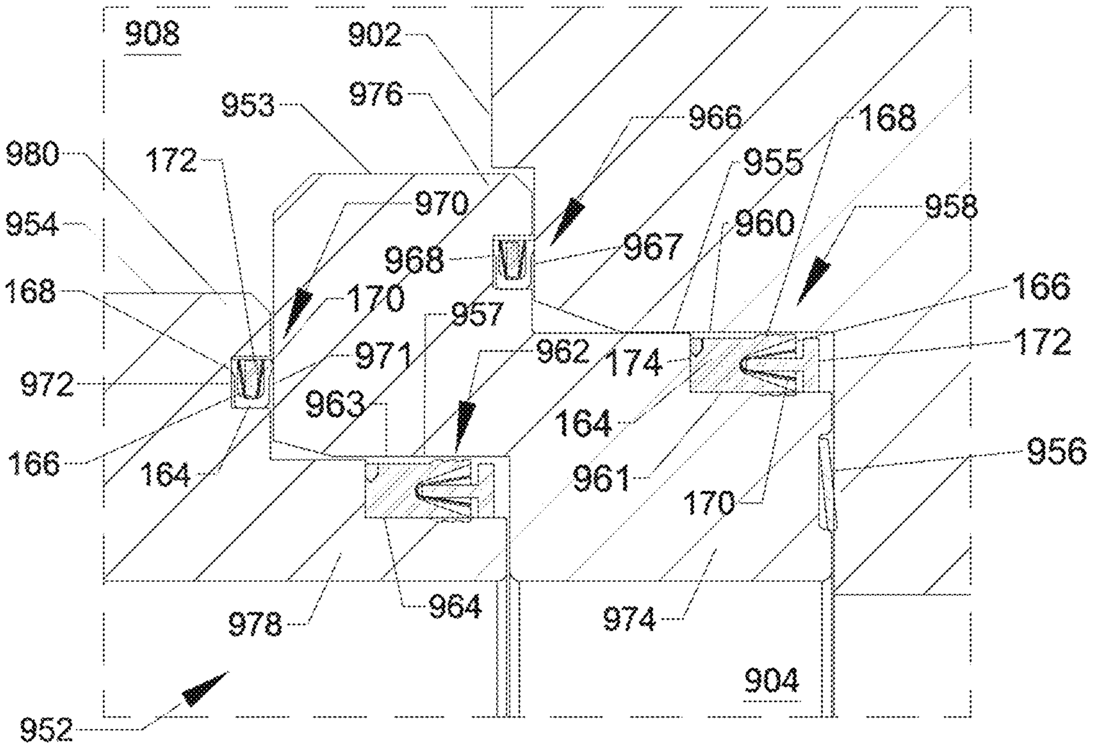
FIG. 14 is a further enlarged cross-sectional view of a portion of the gate valve denoted in FIG. 13 illustrating additional aspects of the body, gate, seats, seat retainers and seals thereof.
Figure 15:
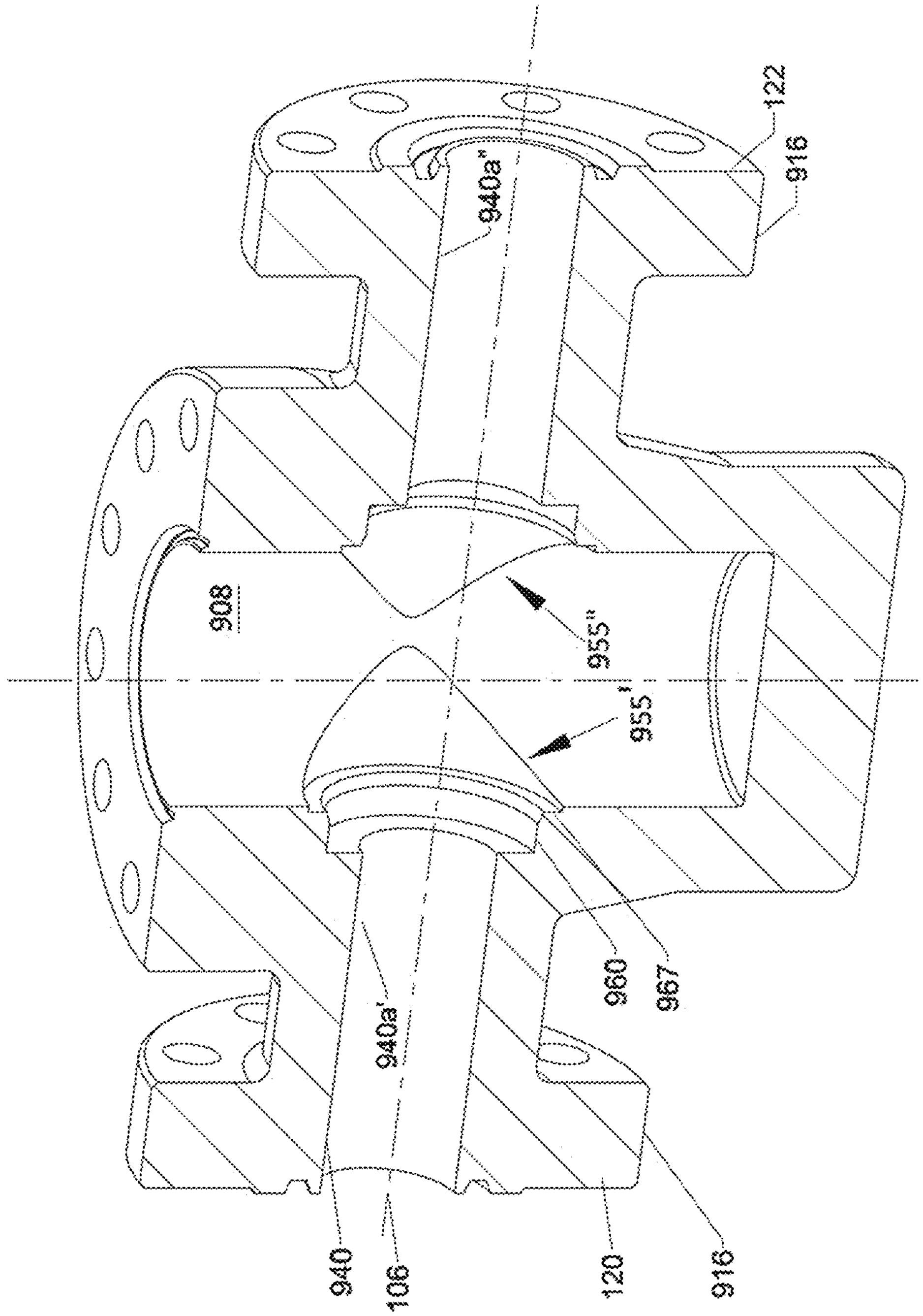
FIG. 15 is a cross sectional perspective view of the gate valve body illustrating the retainer pockets and seal surfaces formed therein.

As best seen in FIG. 14, each respective dual seat assembly 952 further comprises a respective retainer upstream seal 958 disposed along the outer interface between the respective seat retainer 953 and valve body 902. For purposes of simple illustration, the respective elements in FIG. 14 are not denoted first (') or second ("). In the illustrated embodiment, the retainer upstream seal 958 is disposed between a retainer upstream pair of opposing faces 960, 961 of the respective seat retainer 953 and retainer pocket 955. Specifically, face 960 is a radially-inward facing surface of the retainer pocket 955, and face 961 is a radially-outward facing shoulder formed on the wall portion 974 of the seat retainer 953. In the illustrated embodiment, the retainer upstream pair of opposing faces 960, 961 are oriented parallel to the bore axis 106. The retainer upstream seal 958 is configured to prevent fluid 118 from moving in a direction from the flow bore 904 towards the cavity 908.

Each respective dual seat assembly 952 further comprises a respective seat upstream seal 962 disposed along the inner interface between the respective seat retainer 953 and seat 954. In the illustrated embodiment of FIG. 14, the seat upstream seal 962 is disposed between a seat upstream pair of opposing faces 963, 964 of the respective seat 954 and seat pocket 957. Specifically, face 963 is a radially-inward facing surface of the seat pocket 957, and face 964 is a radially-outward facing shoulder formed on the wall portion 978 of the seat 954. In the illustrated embodiment, the seat upstream pair of opposing faces 963, 964 are oriented parallel to the bore axis 106. The seat upstream seal 962 is configured to prevent fluid 118 from moving in a direction from the flow bore 904 toward the cavity 908.

Each respective dual seat assembly 952 still further comprises a respective retainer downstream seal 966 disposed along the outer interface between the respective seat retainer 953 and valve body 902. In the illustrated embodiment of FIG. 14, the retainer downstream seal 966 is disposed between a retainer downstream pair of opposing faces 967, 968 of the respective seat retainer 953 and valve body 902. Specifically, face 967 is an axially-inward facing (i.e., toward the gate 912) shoulder on the valve body 902 surrounding the retainer pocket 955, and face 968 is a axially-outward facing groove formed on the rim portion 976 of the seat retainer 953. In the illustrated embodiment, the retainer downstream pair of opposing faces 967, 968 are oriented perpendicular to the bore axis 106. The retainer downstream seal 966 is configured to prevent fluid 118 from moving in a direction from the cavity 908 toward the flow bore 904.

Each respective dual seat assembly 952 yet further comprises a respective seat downstream seal 970 disposed along the inner interface between the respective seat retainer 953 and seat 954. In the illustrated embodiment of FIG. 14, the seat upstream seal 962 is disposed between a retainer downstream pair of opposing faces 971, 972 of the respective seat retainer 953 and seat 954. Specifically, face 971 is an axially-inward facing surface of the rim portion 976 of the seat retainer 953, and face 972 is a axially-outward facing groove formed on the rim portion 980 of the seat 954. In the illustrated embodiment, the seat downstream pair of opposing faces 971, 972 are oriented perpendicular to the bore axis 106. The seat downstream seal 972 is configured to prevent fluid 118 from moving in a direction from the cavity 908 toward the flow bore 904.

In preferred embodiments, the seals 958, 962, 966 and 970 of the dual seat assemblies 952 are annular seals of the spring energized type substantially similar to seals 158 and 160 previously describe in connection with gate valve 100. As best seen in FIG. 14, such seals can include an annular body 164 having a V-shaped or U-shaped concave surface 166 forming a pair of seal lips 168 extending from the body. The seals 958, 962, 966 and 970 may be composed of polymer, elastomeric, non-elastomeric, and/or metallic material or some combination thereof and are configured to be suitable to any application depending on the variability of environmental factors such as flow pressure (low/high) and temperature. A V-shaped seal spring 170 can be disposed between the seal lips 168 and stabilized by a hat ring 172. A reinforcing ring 174 can be provided in the body 164 of the seal to prevent extrusion of the material due to high pressures or temperatures.

When the seats 954 and seat retainers 953 carrying the seals 958, 962, 966 and 970 are installed in the respective seat pockets 955 and retainer pockets 957, the seal springs 170 of the seals are compressed between the respective opposing faces of the seats, seat retainers and pockets. In other words, when installed, each seal spring 170 is pushing outward against the compression, creating initial upstream fluid seals in the retainer upstream seals 958 and seat upstream seals 962 using spring force to push the seal lips 168 of the upstream seals against the associated opposing faces, and creating initial downstream fluid seals in the retainer downstream seals 966 and seat downstream seals 970 using spring force to push the seal lips of the downstream seals against the associated opposed faces. When pressure from the pressurized fluid 118 in the gate valve reaches the concave surfaces 166 of seals 958, 962, 966 and 970, the force from the pressure is added to the spring force from the seal springs 170 to increasingly press the seal lips 168 of each respective seal against the respective faces of the seats, seat retainers and pockets, thereby preventing leakage of pressure or fluid. These spring energized seals, however, work only when the pressure is applied to the concave surface side of the seals 958, 962, 966 and 970; otherwise the pressure and fluid can leak by the seal relatively easily. Thus, to provide a bi-directional seal from pressure coming from either direction of the valve body, the orientation of the concave surfaces 166 along the path of the outer interface is reversed between the retainer upstream seal 958 and the retainer downstream seal 966; e.g., in the embodiment of FIG. 14, the concave surfaces point away from one another along the path of the outer interface. Similarly, the orientation of the concave surfaces 166 along the path of the inner interface is reversed between the seat upstream seal 962 and the seat downstream seal 970; e.g., in the embodiment of FIG. 14 the concave surfaces 166 point away from one another along the path of the inner interface.

In the embodiment of FIG. 14, when there is higher pressure in the bore 904 versus the cavity 908, the pressure will push fluid from the flow bore along the path of the outer interface between the retainer pocket 955 and the seat retainer 953 until it encounters the concave surface 166 of the retainer upstream seal 958 facing into the direction of this flow from the flow bore and (provided the retainer upstream seal and relevant opposing faces 960, 961 are in good condition) thereby activating the retainer upstream seal to stop fluid leakage along the outer interface into the cavity 908. However, if the retainer upstream seal 958 or opposing faces are worn or damaged, the pressurized fluid will leak past the retainer upstream seal toward the cavity 908, flow along the outer interface and leak past the retainer downstream seal 966 and into the cavity, because the concave surface 166 of the retainer downstream seal is oriented in the reversed direction for this flow, i.e., facing away from the direction of flow, and thus will not activate. Similarly, higher pressure in the flow bore 904 will push fluid along the path of the inner interface between the seat pocket 957 and the seat 954 until it encounters the concave surface 166 of the seat upstream seal 962 facing into the direction of flow from the flow bore, and (provided the seat upstream seal and relevant opposing faces 963, 964 are in good condition) thereby activating the seat upstream seal to stop fluid leakage along the inner interface into the cavity 908. However, if the seat upstream seal 962 or opposing faces are worn or damaged, pressurized fluid will leak past the seat upstream seal toward the cavity 908, flow along the inner interface and leak past the seat downstream seal 970 and into the cavity, because the concave surface 166 of the seat downstream seal is oriented in the reversed direction for this flow, i.e., facing away from the direction of flow, and thus will not activate.

On the other hand, when there is higher pressure in the cavity 908 versus the flow bore 904, the pressure will push fluid from the cavity along the path of the outer interface between the retainer pocket 955 and the seat retainer 953 until it encounters the concave surface 166 of the retainer downstream seal 966 facing into the direction of this flow from the cavity, and (provided the retainer downstream seal and relevant opposing faces 967, 968 are in good condition) thereby activating the retainer downstream seal to stop fluid leakage along the outer interface into the flow bore 904. However, if the retainer downstream seal 966 or opposing faces are worn or damaged, pressurized fluid will leak past the retainer downstream seal toward the flow bore 904, flow along the outer interface and leak past the retainer upstream seal 958 and into the flow bore, because the concave surface 166 of the retainer upstream seal is oriented in the reversed direction for this flow, i.e., facing away from the direction of flow, and thus will not activate. Similarly, higher pressure from the cavity 908 will push fluid along the path of the inner interface between the seat pocket 957 and the seat 954 until it encounters the concave surface 166 of the seat downstream seal 970 facing into the flow from the cavity, and (provided the seat downstream seal and relevant opposing faces 971, 972 are in good condition) thereby activating the seat downstream seal to stop leakage along the inner interface into the flow bore 904. However, if the seat downstream seal 970 or opposing faces are worn or damaged, pressurized fluid will leak past the seat downstream seal towards the flow bore 904, flow along the inner interface and leak past the seat upstream seal 962 and flow into the flow bore, because the concave surface 166 of the seat upstream seal is oriented in the reversed direction for this flow, i.e., facing away for the direction of flow, and thus will not activate.

Each respective dual seat assembly 952 even further comprises a respective annular retainer spring 956 disposed in a retainer spring pocket formed on the axial outward facing ends (i.e., facing away from the gate 912) of the seat retainer 953. When the seat retainer 953 is pushed into the retainer pocket 955, the retainer spring 956 is compressed between the inward facing end of the retainer pocket and the outward facing end of the retainer spring pocket, thus biasing the seat retainer (and also the seat 954 carried by the seat retainer) axially inward against the gate 912. This inward biasing of the respective retainers 953 and seats 954 allows the inward facing ends of the seats to maintain contact with the respective surfaces of the gate 912 as it moves between the open and closed position.

The gate valve 900 having dual seat assemblies 952 on each side of the gate 912 provides several advantages compared to gate valves having a single seat assembly on each side of the gate (e.g., seat assembly 152 on gate valve 100). The dual seat assembly 952 including the seat retainer 953 and the seat 954 has two replaceable components that can be selectively individually replaced depending on their individual state of wear or damage. Thus, for example, if the seat 954 becomes worn or damaged due to contact with the gate 912, the seat can be replaced while the seat retainer 953 is retained. Conversely, if the seat retainer 953 becomes worn or damaged, the seat retainer can be replaced while the seat 954 is retained. As best seen in FIG. 13, each of the replaceable dual seat components 953, 954 is thinner (i.e., in the axial direction) than a single seat having the same overall thickness, thus each dual seat component will contain less material than the single seat, and thus may be less expensive. For example, in FIG. 13, seat 954 has a width denoted $D_A$, seat retainer 953 has a width denoted $D_B$, and a single seat spanning the same distance between the valve body 902 and gate 912 would have a width of $D_C$, where $D_A<D_C$ and $D_B<D_C$.

Further, in the gate valve 900 having dual seat assemblies 952, the bending moment exerted on the seals 958, 962 at the base of each component 953, 954 by the sliding force of the gate 912 will be less that the bending moment exerted on the seals at the base of a single component seat of the same overall width. For example, in FIG. 13, the sliding force of the gate 912 against the seat 954, denoted $F_G$, will produce a bending moment of $F_G \times D_E$ at seat upstream seal 962, and $F_G \times D_F$ at retainer upstream seal 958, whereas in a single seat assembly, the bending moment at the single upstream seal having the same overall width (e.g., 158) would be $F_G \times D_G$, where $F_G \times D_E < F_G \times D_G$ and $F_G \times D_F < F_G \times D_G$. The reduction of bending moment provided by the dual seat assemblies 952 is believed to reduce deformation and wear on the seals 958 and 962, this providing improvements in service life and reduced leakage.

It will be appreciated by those skilled in the art having the benefit of this disclosure that this gate valve and seat for a gate valve provides a better wear resistance, less maintenance and increased safety in comparison to conventional gate valves. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A gate valve comprising:

a valve body including a cavity in fluid communication with a flow bore, the flow bore defining a bore axis through the valve body and having a first outer bore portion defined by a first body portion on a first side of the cavity and a second outer bore portion defined by a second body portion on a second side of the cavity;

an annular first seat retainer disposed in a first retainer pocket formed on an inner surface of the first body portion facing the second side of the cavity, the first seat retainer having a retainer bore therethrough forming a first intermediate bore portion of the flow bore;

an annular first seat disposed in a first seat pocket formed on an inner surface of the first seat retainer facing the second side of the cavity, the first seat having a seat bore therethrough forming a first inner bore portion of the flow bore;

an annular second seat retainer disposed in a second retainer pocket formed on an inner surface of the second body portion facing the first side of the cavity, the second seat retainer having a retainer bore therethrough forming a second intermediate bore portion of the flow bore;

an annular second seat disposed in a second seat pocket formed on an inner surface of the second seat retainer facing the first side of the cavity, the second seat having a seat bore therethrough forming a second inner bore portion of the flow bore;

a gate disposed in the cavity between the first seat and the second seat and movable along a stem axis perpendicular to the bore axis between an open gate position and a closed gate position;

wherein, when the gate is in the open gate position, a gate bore formed therethrough is aligned with the first inner bore portion and the second inner bore portion to allow fluid flow through the valve body;

wherein, when the gate is in the closed gate position, the gate bore is not aligned with the first inner bore portion and the second inner bore portion to block fluid flow through the valve body;

a first retainer upstream seal disposed along a first outer interface between the first seat retainer and the first retainer pocket between a first retainer upstream pair of opposing faces of the first seat retainer and the first retainer pocket;

a first seat upstream seal disposed along a first inner interface between the first seat and the first seat pocket between a first seat upstream pair of opposing faces of the first seat and the first seat pocket;

wherein both the first retainer upstream seal and the first seat upstream seal are configured to prevent fluid from moving along the respective first outer and inner interfaces in a direction from the flow bore into the cavity; and a first retainer downstream seal disposed along the first outer interface between a first retainer downstream pair of opposing faces of the first seat retainer and the first retainer pocket;

a first seat downstream seal disposed along the first inner interface between a first seat downstream pair of opposing faces of the first seat and the first seat pocket; and wherein both the first retainer downstream seal and the first seat downstream seal are configured to prevent fluid from moving along the respective first outer and inner interfaces in a direction from the cavity into the flow bore; and wherein the first retainer upstream pair of opposing faces includes:

a radially outward face of a first shoulder formed at an axial end of the first seat retainer adjacent the first retainer pocket of the first body portion; and a radially inward face of the first retainer pocket.

2. A gate valve comprising:

a valve body including a cavity in fluid communication with a flow bore, the flow bore defining a bore axis through the valve body and having a first outer bore portion defined by a first body portion on a first side of the cavity and a second outer bore portion defined by a second body portion on a second side of the cavity;

an annular first seat retainer disposed in a first retainer pocket formed on an inner surface of the first body portion facing the second side of the cavity, the first seat retainer having a retainer bore therethrough forming a first intermediate bore portion of the flow bore;

an annular first seat disposed in a first seat pocket formed on an inner surface of the first seat retainer facing the second side of the cavity, the first seat having a seat bore therethrough forming a first inner bore portion of the flow bore;

an annular second seat retainer disposed in a second retainer pocket formed on an inner surface of the second body portion facing the first side of the cavity, the second seat retainer having a retainer bore therethrough forming a second intermediate bore portion of the flow bore;

an annular second seat disposed in a second seat pocket formed on an inner surface of the second seat retainer facing the first side of the cavity, the second seat having a seat bore therethrough forming a second inner bore portion of the flow bore;

a gate disposed in the cavity between the first seat and the second seat and movable along a stem axis perpendicular to the bore axis between an open gate position and a closed gate position;

wherein, when the gate is in the open gate position, a gate bore formed therethrough is aligned with the first inner bore portion and the second inner bore portion to allow fluid flow through the valve body;

wherein, when the gate is in the closed gate position, the gate bore is not aligned with the first inner bore portion and the second inner bore portion to block fluid flow through the valve body;

a first retainer upstream seal disposed along a first outer interface between the first seat retainer and the first retainer pocket between a first retainer upstream pair of opposing faces of the first seat retainer and the first retainer pocket;

a first seat upstream seal disposed along a first inner interface between the first seat and the first seat pocket between a first seat upstream pair of opposing faces of the first seat and the first seat pocket;

wherein both the first retainer upstream seal and the first seat upstream seal are configured to prevent fluid from moving along the respective first outer and inner interfaces in a direction from the flow bore into the cavity; and a first retainer downstream seal disposed along the first outer interface between a first retainer downstream pair of opposing faces of the first seat retainer and the first retainer pocket;

a first seat downstream seal disposed along the first inner interface between a first seat downstream pair of opposing faces of the first seat and the first seat pocket; and wherein both the first retainer downstream seal and the first seat downstream seal are configured to prevent fluid from moving along the respective first outer and inner interfaces in a direction from the cavity into the flow bore; and wherein the first retainer upstream pair of opposing faces has a first orientation relative to the bore axis and the first retainer downstream pair of opposing faces has a second orientation relative to the bore axis that is different from the first orientation; and wherein the first seat upstream pair of opposing faces has a third orientation relative to the bore axis and the first seat downstream pair of opposing faces has a fourth orientation relative to the bore axis that is different from the third orientation.

3. The gate valve of claim 2, wherein the first orientation relative to the bore axis of the first retainer upstream pair of opposing faces and the third orientation relative to the bore axis of the first seat upstream pair of opposing faces are the same orientation.

4. The gate valve of claim 2, wherein the second orientation relative to the bore axis of the first retainer downstream pair of opposing faces and the fourth orientation relative to the bore axis of the first seat downstream pair of opposing faces are the same orientation.

5. A gate valve comprising:

a valve body including a cavity in fluid communication with a flow bore, the flow bore defining a bore axis through the valve body and having a first outer bore portion defined by a first body portion on a first side of the cavity and a second outer bore portion defined by a second body portion on a second side of the cavity;

an annular first seat retainer disposed in a first retainer pocket formed on an inner surface of the first body portion facing the second side of the cavity, the first seat retainer having a retainer bore therethrough forming a first intermediate bore portion of the flow bore;

an annular first seat disposed in a first seat pocket formed on an inner surface of the first seat retainer facing the second side of the cavity, the first seat having a seat bore therethrough forming a first inner bore portion of the flow bore;

a gate disposed in the cavity between the first seat and the second outer bore portion and movable along a stem axis perpendicular to the bore axis between an open gate position and a closed gate position;

wherein, when the gate is in the open gate position, a gate bore formed therethrough is aligned with the first inner bore portion and the second outer bore portion to allow fluid flow through the valve body;

wherein, when the gate is in the closed gate position, the gate bore is not aligned with the first inner bore portion and the second outer bore portion to block fluid flow through the valve body;

a first retainer upstream seal disposed along a first outer interface between the first seat retainer and the first retainer pocket between a first retainer upstream pair of opposing faces of the first seat retainer and the first retainer pocket;

a first seat upstream seal disposed along a first inner interface between the first seat and the first seat pocket between a first seat upstream pair of opposing faces of the first seat and the first seat pocket;

wherein both the first retainer upstream seal and the first seat upstream seal are configured to prevent fluid from moving along the respective first outer and inner interfaces in a direction from the flow bore into the cavity; and a first retainer downstream seal disposed along the first outer interface between a first retainer downstream pair of opposing faces of the first seat retainer and the first retainer pocket;

a first seat downstream seal disposed along the first inner interface between a first seat downstream pair of opposing faces of the first seat and the first seat pocket; and wherein both the first retainer downstream seal and the first seat downstream seal are configured to prevent fluid from moving along the respective first outer and inner interfaces in a direction from the cavity into the flow bore; and wherein the first retainer upstream pair of opposing faces includes:

a radially outward face of a first shoulder formed at an axial end of the first seat retainer adjacent the first retainer pocket of the first body portion; and a radially inward face of the first retainer pocket.

6. A gate valve comprising:

a valve body including a cavity in fluid communication with a flow bore, the flow bore defining a bore axis through the valve body and having a first outer bore portion defined by a first body portion on a first side of the cavity and a second outer bore portion defined by a second body portion on a second side of the cavity;

an annular first seat retainer disposed in a first retainer pocket formed on an inner surface of the first body portion facing the second side of the cavity, the first seat retainer having a retainer bore therethrough forming a first intermediate bore portion of the flow bore;

an annular first seat disposed in a first seat pocket formed on an inner surface of the first seat retainer facing the second side of the cavity, the first seat having a seat bore therethrough forming a first inner bore portion of the flow bore;

a gate disposed in the cavity between the first seat and the second outer bore portion and movable along a stem axis perpendicular to the bore axis between an open gate position and a closed gate position;

wherein, when the gate is in the open gate position, a gate bore formed therethrough is aligned with the first inner bore portion and the second outer bore portion to allow fluid flow through the valve body;

wherein, when the gate is in the closed gate position, the gate bore is not aligned with the first inner bore portion and the second outer bore portion to block fluid flow through the valve body;

a first retainer upstream seal disposed along a first outer interface between the first seat retainer and the first retainer pocket between a first retainer upstream pair of opposing faces of the first seat retainer and the first retainer pocket;

a first seat upstream seal disposed along a first inner interface between the first seat and the first seat pocket between a first seat upstream pair of opposing faces of the first seat and the first seat pocket;

wherein both the first retainer upstream seal and the first seat upstream seal are configured to prevent fluid from moving along the respective first outer and inner interfaces in a direction from the flow bore into the cavity; and a first retainer downstream seal disposed along the first outer interface between a first retainer downstream pair of opposing faces of the first seat retainer and the first retainer pocket;

a first seat downstream seal disposed along the first inner interface between a first seat downstream pair of opposing faces of the first seat and the first seat pocket; and wherein both the first retainer downstream seal and the first seat downstream seal are configured to prevent fluid from moving along the respective first outer and inner interfaces in a direction from the cavity into the flow bore; and wherein the first retainer upstream pair of opposing faces has a first orientation relative to the bore axis and the first retainer downstream pair of opposing faces has a second orientation relative to the bore axis that is different from the first orientation; and wherein the first seat upstream pair of opposing faces has a third orientation relative to the bore axis and the first seat downstream pair of opposing faces has a fourth orientation relative to the bore axis that is different from the third orientation.

7. The gate valve of claim 6, wherein the first orientation relative to the bore axis of the first retainer upstream pair of opposing faces and the third orientation relative to the bore axis of the first seat upstream pair of opposing faces are the same orientation.

8. The gate valve of claim 6, wherein the second orientation relative to the bore axis of the first retainer downstream pair of opposing faces and the fourth orientation relative to the bore axis of the first seat downstream pair of opposing faces are the same orientation.

9. A dual seat assembly for a gate valve configured for mounting in an internal cavity of a gate valve body between a retainer pocket on an inner surface of the gate valve body and a movable gate disposed in the internal cavity of the gate valve body, the seat assembly comprising:

a seat retainer having an annular configuration defining a bore axis therethrough and including a retainer wall portion extending from a retainer rim portion along the bore axis;

the retainer wall portion having a retainer wall outer radius such that an axial end of the retainer wall portion can be slidingly received within a retainer pocket on an inner surface of a gate valve body, and a retainer wall inner radius defining a bore along the bore axis;

the retainer rim portion having a retainer rim outer radius that is greater than the retainer wall outer radius and a retainer rim inner radius that is greater than the retainer wall inner radius, thereby defining a seat pocket on an axial end of the retainer rim portion;

a seat having an annular configuration along the bore axis and including a seat wall portion extending from a seat rim portion along the bore axis;

the seat wall portion having a seat wall outer radius that is smaller than the retainer rim inner radius such that an axial end of the seat wall portion can be slidingly received within the seat pocket on the seat retainer, and a seat wall inner radius equal to the retainer wall inner radius; and the seat rim portion having a seat rim outer radius that is greater than the seat wall outer radius and a seat rim inner radius that is equal to the seat wall inner radius; and a retainer upstream seal mounted between the retainer wall portion and the retainer pocket of the valve body and configured to activate from fluid flow moving from the retainer wall portion toward the retainer rim portion;

a retainer downstream seal mounted between the retainer rim portion and inner surface of the gate valve body and configured to activate from fluid flow moving from the retainer rim portion toward the retainer wall portion;

a seat upstream seal mounted between the seat wall portion and the seat pocket of the seat retainer and configured to activate from fluid flow moving from the seat wall portion toward the seat rim portion; and a seat downstream seal mounted between the seat rim portion and the retainer rim portion and configured to activate from fluid flow moving from the seat rim portion toward the seat wall portion.

10. The dual seat assembly for a gate valve of claim 9, further comprising:

wherein the retainer upstream seal is mounted on a first shoulder formed on the retainer wall portion;

wherein the retainer downstream seal is mounted in a first radial slot formed on the retainer rim portion;

wherein the seat upstream seal is mounted on a second shoulder formed on the seat wall portion; and wherein the seat downstream seal is mounted in a second radial slot formed on the seat rim portion and the retainer rim portion.

11. The dual seat assembly for a gate valve of claim 9, further comprising:

wherein the retainer upstream seal is mounted with its concave seal surface oriented in the axial direction parallel to the bore axis;

wherein the retainer downstream seal is mounted with its concave seal surface oriented in a radial direction perpendicular to the bore axis;

wherein the seat upstream seal is mounted with its concave seal surface oriented in the axial direction parallel to the bore axis; and wherein the seat downstream seal is mounted with its concave seal surface oriented in the radial direction perpendicular to the bore axis.

12. The dual seat assembly for a gate valve of claim 9, further comprising:

wherein the retainer upstream seal is mounted on a first shoulder formed on the retainer wall portion with its concave seal surface oriented in the axial direction parallel to the bore axis;

wherein the retainer downstream seal is mounted in a first radial slot formed on the retainer rim portion with its concave seal surface oriented in the radial direction perpendicular to the bore axis;

wherein the seat upstream seal is mounted on a second shoulder formed on the seat wall portion with its concave seal surface oriented in the axial direction parallel to the bore axis; and wherein the seat downstream seal is mounted in a second radial slot formed on the seat rim portion and the retainer rim portion with its concave seal surface oriented in the radial direction perpendicular to the bore axis.

* * * * *